(12) United States Patent
Watanabe

(10) Patent No.: US 9,329,315 B2
(45) Date of Patent: May 3, 2016

(54) POLARIZING PLATE, METHOD FOR MANUFACTURING POLARIZING PLATE, AND IMAGE DISPLAY DEVICE

(71) Applicant: Konica Minolta, Inc., Tokyo (JP)

(72) Inventor: Yasuhiro Watanabe, Hachioji (JP)

(73) Assignee: Konica Minolta, Inc., Tokyo (JP)

( * ) Notice: Subject to any disclaimer, the term of this patent is extended or adjusted under 35 U.S.C. 154(b) by 0 days.

(21) Appl. No.: 14/408,438

(22) PCT Filed: Jun. 7, 2013

(86) PCT No.: PCT/JP2013/065794
§ 371 (c)(1),
(2) Date: Dec. 16, 2014

(87) PCT Pub. No.: WO2013/191010
PCT Pub. Date: Dec. 27, 2013

(65) Prior Publication Data
US 2015/0185384 A1    Jul. 2, 2015

(30) Foreign Application Priority Data
Jun. 21, 2012   (JP) ................................ 2012-139317

(51) Int. Cl.
*G02B 5/30*     (2006.01)
*G02B 1/10*     (2015.01)
(Continued)

(52) U.S. Cl.
CPC .......... *G02B 5/305* (2013.01); *B29D 11/00644* (2013.01); *G02B 1/105* (2013.01);
(Continued)

(58) Field of Classification Search
CPC ...... G02B 5/305; G02B 1/105; G02B 5/3033; G02B 5/3083; G02B 1/14; B29D 11/00644; Y10T 428/266; B23B 2307/4026; B23B 2307/42; B23B 2457/00; B29K 2029/04; B29K 2105/0032; B29K 2995/0092
USPC ............ 359/487.01, 487.02; 349/96; 313/112
See application file for complete search history.

(56) References Cited

U.S. PATENT DOCUMENTS

2005/0083450 A1*  4/2005  Motomura ............. G02B 5/305
                                                              349/96
2006/0093759 A1*  5/2006  Fukagawa ................. C08J 5/18
                                                              428/1.31
(Continued)

FOREIGN PATENT DOCUMENTS

CN    101750662 A    6/2010
CN    102368100 A    3/2012
(Continued)

OTHER PUBLICATIONS

International Preliminary Report on Patentability dated Dec. 23, 2014 along with English translation for PCT/JP2013/065794.
(Continued)

*Primary Examiner* — Frank Font
(74) *Attorney, Agent, or Firm* — Lucas & Mercanti, LLP

(57) ABSTRACT

The present invention addresses the problem of providing a thin polarizing plate having a favorable degree of polarization, a method for manufacturing the same, and an image display device that uses the polarizing plate. This polarizing plate is a polarizing plate in which a hard-coat layer is directly laminated on a polarizer, wherein the polarizing plate is characterized in that thickness of the polarizer is 0.5 μm to 10 μm, and the pencil hardness of the hard-coat layer ranges from B to H.

7 Claims, 7 Drawing Sheets

(51) Int. Cl.
*G02B 1/14* (2015.01)
*B29D 11/00* (2006.01)
*B29K 29/00* (2006.01)
*B29K 105/00* (2006.01)

(52) U.S. Cl.
CPC .............. *G02B 1/14* (2015.01); *G02B 5/3033* (2013.01); *G02B 5/3083* (2013.01); *B29K 2029/04* (2013.01); *B29K 2105/0032* (2013.01); *B29K 2995/0092* (2013.01); *B32B 2307/4026* (2013.01); *B32B 2307/42* (2013.01); *B32B 2457/00* (2013.01); *Y10T 428/266* (2015.01)

(56) References Cited

U.S. PATENT DOCUMENTS

| | | | | |
|---|---|---|---|---|
| 2006/0105155 | A1* | 5/2006 | Ikeyama | G02B 5/0226 428/220 |
| 2009/0021671 | A1* | 1/2009 | Fukagawa | C08J 5/18 349/96 |
| 2009/0153782 | A1* | 6/2009 | Fukagawa | G02B 5/3083 349/96 |
| 2009/0268292 | A1* | 10/2009 | Nakai | B29C 71/02 359/488.01 |
| 2009/0280317 | A1* | 11/2009 | Nakashima | G02B 1/105 428/332 |
| 2010/0104879 | A1* | 4/2010 | Okano | G02B 1/105 428/447 |
| 2011/0026116 | A1* | 2/2011 | Nishimura | G02B 1/105 359/485.01 |
| 2011/0151145 | A1* | 6/2011 | Kamohara | C08B 3/00 428/1.33 |
| 2011/0151146 | A1* | 6/2011 | Okano | C08J 7/04 428/1.33 |
| 2012/0056211 | A1* | 3/2012 | Kitagawa | B29C 55/026 257/88 |

FOREIGN PATENT DOCUMENTS

| | | |
|---|---|---|
| JP | 2004-240087 A | 8/2004 |
| JP | 2010-152351 A | 7/2010 |
| JP | 2011-100161 A | 5/2011 |
| JP | 2011-170339 A | 9/2011 |
| JP | 2011-221185 A | 11/2011 |
| JP | 2011-221186 A | 11/2011 |
| JP | 2012-134117 A | 7/2012 |
| JP | 2012073563 A | 12/2012 |

OTHER PUBLICATIONS

Chinese Office Action: Application No. 201380032093.X: Date of Notification: Feb. 4, 2016; Applicant: KONICA MINOLTA, INC.; total of 7 pages. English translation of Chinese Office Action; total of 10 pages. Grand Total of 17 pages.
Korean Office Action: Notice of Preliminary Rejection; Mailing Date: Feb. 1, 2016; Patent Application No. 10-2014-7034392; Title of Invention: POLARIZING PLATE, METHOD FOR MANUFACTURING POLARIZING PLATE, AND IMAGE DISPLAY DEVICE; Applicant: Konica Minolta, Inc.; total of 5 pages; English translation of Korean Office Action: Notice of Preliminary Rejection; total of 4 pages; Grand total of 9 pages.

\* cited by examiner

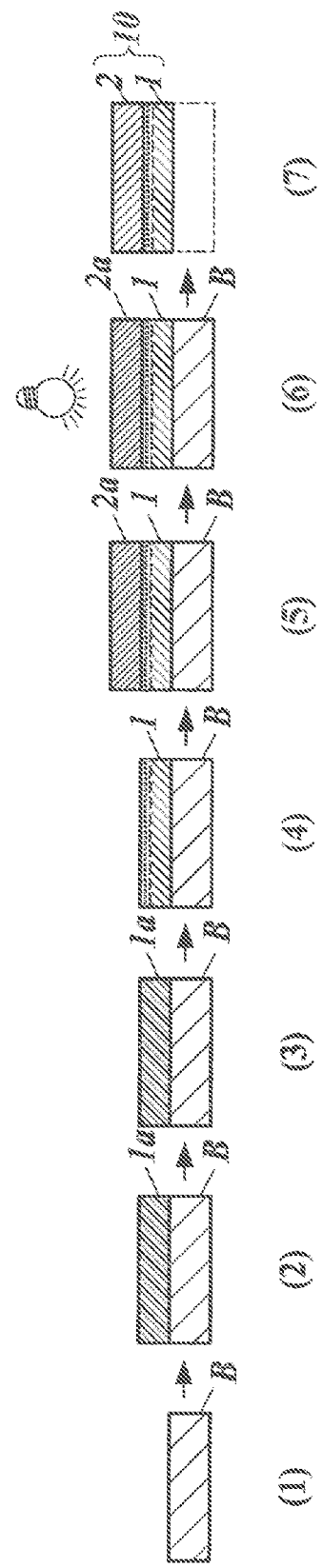

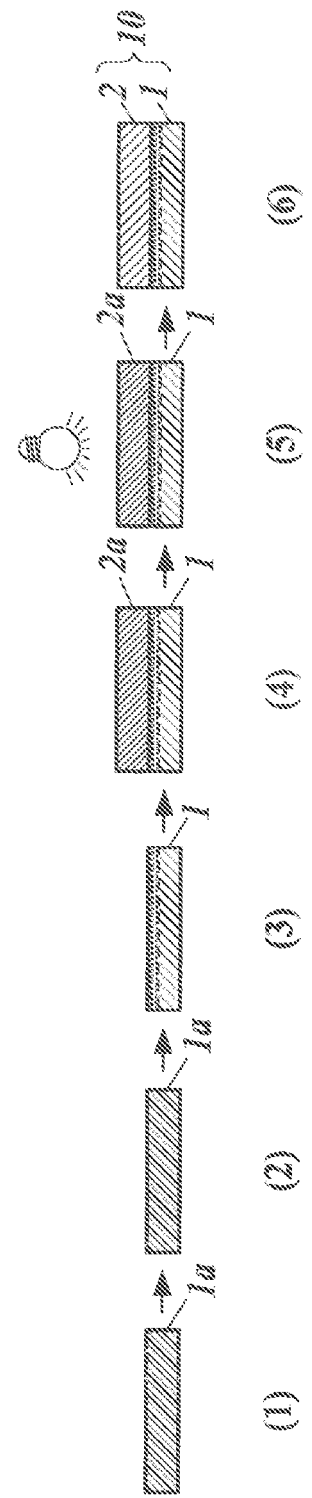

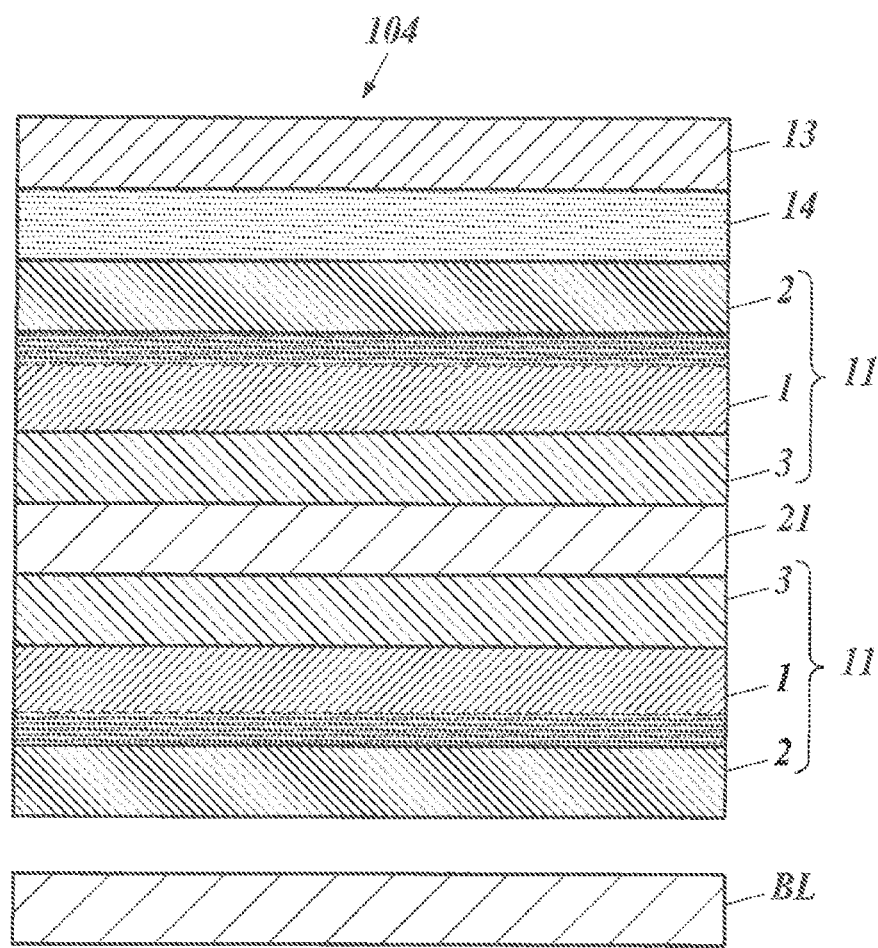

POLARIZING PLATE, METHOD FOR MANUFACTURING POLARIZING PLATE, AND IMAGE DISPLAY DEVICE

CROSS REFERENCE TO RELATED APPLICATION

This Application is a 371 of PCT/JP2013/065794 filed on Jun. 7, 2013 which, in turn, claimed the priority of Japanese Patent Application No. JP2012-139317 filed on Jun. 21, 2012 both applications are incorporated herein by reference.

TECHNICAL FIELD

The present invention relates to a polarizing plate, a method for producing a polarizing plate, and an image display device.

BACKGROUND ART

The market for flat panel displays including liquid crystal panels and an organic electroluminescence panels has rapidly been expanding in recent years. In particular, the markets for small and medium-sized mobile devices, such as so-called smart phones and tablets, are growing sharply. Such small and medium-sized mobile devices need reductions in thickness and in weight along with enhancements in contrast of displayed images. Thinning of components constituting the devices, therefore, has been studied.

For example, a technique for producing a thin polarizing plate of a mobile device is disclosed (e.g., refer to PTL 1), which technique involves stretching of a laminate of a base material layer and a hydrophilic polymer layer.

According to the technique disclosed in PTL 1, the stretched hydrophilic polymer layer can be dyed with a dichroic substance and can function as a polarizer having a thickness of 10 µm or less, which is less than the thickness of conventional polarizers, that is, 20 µm or more.

Preparation of the polarizing plate requires, however, a transparent protective layer for protecting a surface of the polarizer. Since the protective layers used for the polarizing plates typically have a thickness of 60 to 100 µm, mere thinning of the polarizer as described above has no significant effect on reductions in thickness of the entire polarizing plates.

A technique for forming a protective layer by applying a curable resin directly on a polarizer to thin a polarizing plate is also disclosed (e.g., refer to PTL 2).

The technique disclosed in PTL 2 can provide a protective layer which is thinner than a protective film laminated to a polarizer with an adhesive, resulting in thinning of the polarizing plate. This technology provides a hard protective layer having a pencil hardness of 4H to prevent scratches on the surface of the polarizing plate.

Although a protective layer with high hardness formed on a polarizer with a thickness of 20 µm or more by curable resin coating does not cause problems such as insufficient polarization, a protective layer formed on a polarizer with a thickness of, for example, 10 µm or less would cause cracks or large distortion at the interface between the polarizer and the protective layer due to stress generated at the interface, resulting in a low polarization. Furthermore, a combination of a protective layer with a thin polarizer sometimes causes generation of color unevenness in the polarizing plate after preservation in a rolled form in the producing process.

Thus, a protective layer formed on a thin polarizer by curable resin coating cannot function as a polarizing plate having a small thickness and excellent polarization.

CITATION LIST

Patent Literature

PTL 1: Japanese Unexamined Patent Application Publication No. 2011-100161
PTL 2: Japanese Unexamined Patent Application Publication No. 2011-221185

SUMMARY OF INVENTION

Technical Problem

An object of the present invention, which has been made to solve the above problems, is to provide a polarizing plate having a small thickness and excellent polarization, a method for producing the polarizing plate, and an image display device including the polarizing plate.

Solution to Problem

The inventors, who have conducted intensive studies, have found that insufficient polarization of a thinned polarizer caused by handling and during preservation can be reduced by controlling a pencil hardness of the hard coat layer within the range of B to H, unlike typical hard coat outermost layers having a pencil hardness of 4H to prevent scratches. Hard coat layers having a hardness lower than B did not prevent scratches on the surfaces of polarizing plates during the bonding process of the polarizing plates and the panel transportation in the liquid crystal panel production. Thus, the present invention has been completed as a means for solving the problems.

The invention described in item 1 provides a polarizing plate including a polarizing plate and a hard coat layer directly disposed on a first surface of the polarizer, the polarizer having a thickness ranging from 0.5 µm to 10 µm, the hard coat layer having a pencil hardness ranging from B to H.

The invention described in item 2 provides the polarizing plate according to item 1 further including a retardation film disposed on a second surface of the polarizer.

The invention described in item 3 provides the polarizing plate according to item 1 or 2, wherein the first surface of the polarizer is dyed with dichroic pigment.

The invention described in item 4 provides the polarizing plate according to any one of items 1 to 3, wherein the polarizer has a thickness ranging from 0.5 µm to less than 5 µm.

The invention described in item 5 provides a method of producing a polarizing plate involving (a) forming a polarizer and (b) forming a hard coat layer having a pencil hardness ranging from B to H on the polarizer by a coating process. Step(a) involves (a-1) forming a hydrophilic polymer layer on a resin substrate by a coating process; (a-2) stretching the hydrophilic polymer layer into a thickness ranging from 0.5 µm to 10 µm; and (a-3) dyeing the hydrophilic polymer layer with dichroic pigment. Steps (a-2) and (a-3) are executed in any order.

The invention described in item 6 provides an image display device including a polarizing plate produced by the method according to any one of items 1 to 4, or 5.

Advantageous Effects of Invention

The invention provides a thin polarizing plate having a small thickness and excellent polarization, a method for pro-

BRIEF DESCRIPTION OF DRAWINGS

FIG. 2A is a process chart of a method of producing a polarizing plate according to the present invention through a coating process using a stretching substrate.

FIG. 2B is a process chart of a method of producing a polarizing plate according to the present invention without using a stretching substrate.

FIG. 6 is a schematic diagram showing an example VA liquid crystal display device with a touch panel as an image display device.

DESCRIPTION OF EMBODIMENTS

The polarizing plate of the present invention includes a polarizer and a hard coat layer directly disposed on a first surface of the polarizer. The polarizer has a thickness ranging from 0.5 μm to 10 μm. The hard coat layer has a pencil hardness ranging from B to H and can contribute to a reduction in thickness and excellent polarization of the polarizing plate. This is a technical feature common to items 1 through 4 according to the invention.

In an embodiment of the present invention, the polarizing plate preferably further comprises a retardation film disposed on a second surface of the polarizer described above in order to enhance the advantageous effects of the present invention.

Preferably, the first surface of the polarizer is dyed with dichroic pigment and the hard coat layer is disposed on the first surface.

More preferably, the polarizer has a thickness ranging from 0.5 μm to less than 5 μm.

A method of producing a polarizing plate of the present invention involves forming a polarizer and forming a hard coat layer on the polarizer by a coating process. The step of forming the polarizer involves forming a hydrophilic polymer layer on a resin substrate by a coating process, stretching the hydrophilic polymer layer into a thickness ranging from 0.5 μm to 10 μm, and dyeing the hydrophilic polymer layer with dichroic pigment. The stretching and dyeing steps are executed in any order.

The preferred embodiments for carrying out the present invention will now be described below with reference to the accompanying drawings. It should be noted that a variety of technically preferable limitations are imposed on embodiments, which will be mentioned below, in order to carry out the present invention; however, the scope of the invention is not limited to the embodiments and illustrated examples.

In the embodiments, the numerical range expressed by the wording "a number to another number" refers to the range that falls between the former number indicating the lower limit and the latter number indicating the upper limit of the range.

(1) Structural Outline of Polarizing Plate

The structure of the polarizing plate according to the present invention will now be described with reference to FIG. 1A and FIG. 1B.

Figure 1A:
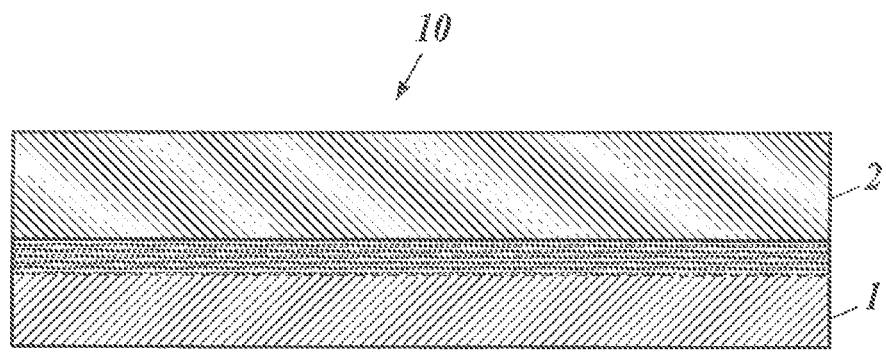
FIG. 1A is a schematic diagram of a basic polarizing plate according to the present invention.

With reference to FIG. 1A, a polarizing plate 10 includes a polarizer 1 and a hard coat layer 2 directly disposed on the polarizer 1.

Figure 1B:
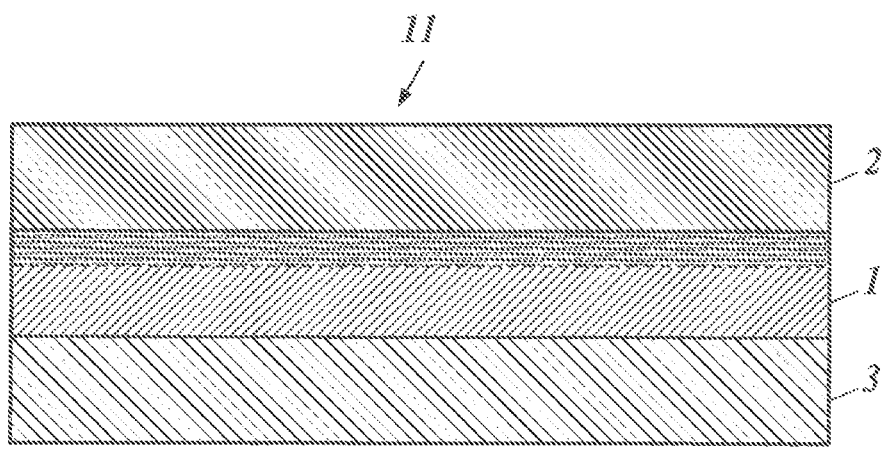
FIG. 1B is a schematic diagram of a polarizing plate having a retardation film according to the present invention.

With reference to FIG. 1B, the polarizing plate 11 further includes a retardation film 3 disposed on a second surface of the polarizer 1, in addition to the hard coat layer 2 directly disposed on the first surface of the polarizer 1.

The first surface of the polarizer 1 of the polarizing plate 11 is dyed with dichroic pigment, and the hard coat layer 2 is disposed on the first layer. If the polarizer 1 has a small thickness, the dyed depth may reach the second surface of the polarizer 1, resulting in dyeing of the entire polarizer 1.

The polarizing plate 11 is composed of a retardation film 3 bonded to the polarizer 10. It is preferred that the polarizing plate 10 and retardation film 3 be bonded such that the absorption axis of the polarizer 1 is perpendicular to the slow axis of the retardation film 3. (It is preferred that the stretched direction of the polarizer 1 be perpendicular to that of the retardation film 3.)

(2) Polarizer

A polarizer 1 is a thin film of, for example, a hydrophilic polymer.

The polarizer 1 is formed by disposing a hydrophilic polymer layer on a thermoplastic resin substrate by a coating process and then stretching the hydrophilic polymer layer together with the thermoplastic resin substrate. A hydrophilic polymer film alone may be stretched to form a polarizer 1.

The polarizer 1 has a thickness ranging from 0.5 μm to 10 μm, preferably from 0.5 μm to less than 5 μm.

(2-1) Thermoplastic Resin Substrate

A thermoplastic resin substrate functions as a stretching substrate for stretching a hydrophilic polymer layer formed thereon.

Examples of such a thermoplastic resin used for a thermoplastic resin substrate include cellulose resins such as triacetyl cellulose, polyester resins such as polyethylene terephthalate and polyethylene naphthalate, polyethersulfone resins, polysulfone resins, polycarbonate resins, polyamide resins such as nylon and aromatic polyamide, polyimide resins, polyolefin resins such as polyethylene, polypropylene, and an ethylene-propylene copolymer, norbornene structure-containing cyclic polyolefin resins (norbornene resins), (meth)acrylic resins, polyarylate resins, polystyrene resins, poly(vinyl alcohol) resins, and mixtures thereof. These resins can be used without limitation. Preferred thermoplastic resin substrates are polyethylene terephthalate films, polypropylene films, and triacetyl cellulose films.

The thermoplastic resin substrates have a thickness ranging from 5 to 60 μm.

(2-2) Hydrophilic Polymer Layer

A hydrophilic polymer layer is composed of a hydrophilic polymer as a main component.

Any hydrophilic polymer can be used for the hydrophilic polymer layer without limitation. Poly(vinyl alcohol) materials are preferred. Examples of poly(vinyl alcohol) materials include poly(vinyl alcohol) and its derivatives. Examples of the poly(vinyl alcohol) derivatives include poly(vinyl formal), poly(vinyl acetal), and poly(vinyl alcohol) derivatives modified with olefins such as ethylene and propylene, unsaturated carboxylic acids such as acrylic acid, methacrylic acid, and crotonic acid, or derivatives thereof such as alkyl esters and acrylamides. Further examples of the hydrophilic polymer include partially saponified products of ethylene-vinyl acetate copolymer, dehydrated poly(vinyl alcohol), and dehydrochlorinated poly(vinyl chloride).

The preferred hydrophilic polymers are poly(vinyl alcohol) homopolymers among the poly(vinyl alcohol) materials.

The degree of polymerization of poly(vinyl alcohol) ranges preferably from about 100 to about 10,000, more preferably from 1,000 to 10,000. Poly(vinyl alcohol) having a degree of saponification of about 80 to about 100 mol % is generally used.

The hydrophilic polymer layer may also contain additives such as a plasticizer and a surfactant in addition to the hydrophilic polymer. Examples of the plasticizer include polyols and condensates thereof, such as glycerol, diglycerol, triglycerol, ethylene glycol, propylene glycol, and polyethylene glycol. Additives such as the plasticizer are used in any amount without limitation, but are preferably used in an amount of 20 mass % or less relative to the total amount (100 mass %) of the hydrophilic polymer layer.

The hydrophilic polymer layer can function as a polarizer after undergoing the stretching process and the dyeing process using the dichroic substance. The stretching and dyeing processes can be applied to the hydrophilic polymer layer in any order.

(2-3) Dichroic Dye

Examples of the dichroic dyes used for dyeing the hydrophilic polymer layer include iodine-containing compounds and organic dyes. The dyeing process involves, for example, dipping the hydrophilic polymer layer into a dyeing solution of a dichroic substance in a solvent. A common solvent used in the dyeing solution is water and may further contain an organic solvent compatible with water.

Examples of the usable organic dye include Red BR, Red LR, Red R, Pink LB, Rubin BL, Bordeaux GS, Sky Blue LG, Lemon Yellow, Blue BR, Blue 2R, Navy RY, Green LG, Violet LB, Violet B, Black H, Black B, Black GSP, Yellow 3G, Yellow R, Orange LR, Orange 3R, Scarlet GL, Scarlet KGL, Congo Red, Brilliant Violet BK, Supra Blue G, Supra Blue GL, Supra Orange GL, Direct Sky Blue, Direct Fast Orange S, and Fast Black.

In particular, an iodine-containing compound, i.e., a iodide containing iodine compound, is preferably used from the viewpoint of water solubility, dyeing efficiency, and process suitability. Examples of the iodide include potassium iodide, lithium iodide, sodium iodide, zinc iodide, aluminum iodide, lead iodide, copper iodide, barium iodide, calcium iodide, tin iodide, and titanium iodide. The dyeing solution contains any of these iodides in a concentration of 0.01 to 10 mass %, more preferably 0.1 to 5 mass %. Among these iodides, preferred is potassium iodide. The mass ratio of iodine to potassium iodide is in the range of preferably 1:5 to 1:100, more preferably 1:6 to 1:80, and particularly preferably 1:7 to 1:70.

In the dyeing process, the hydrophilic polymer layer may be immersed in the dyeing solution for any time period, for example, 15 seconds to 5 minutes, more preferably from 1 to 3 minutes. The temperature of the dyeing solution is in the range of preferably 10 to 60° C., more preferably 20 to 40° C.

During the dyeing process, a dichroic dye is adsorbed onto the hydrophilic polymer layer and is aligned. The dyeing process can be carried out before, during, or after the stretching process of the hydrophilic polymer layer, preferably after the stretching process of the hydrophilic polymer layer in view of successful orientation of the dichroic dye adsorbed onto the hydrophilic polymer layer.

The dyeing process is preferably followed by a cross-linking process in which the dichroic dye-adsorbed hydrophilic polymer layer is immersed in a cross-linking solution containing, for example, boron compounds such as boric acid and borax, glyoxal or glutaraldehyde.

(3) Hard Coat Layer

The hard coat layer 2 is a protective layer that is provided to prevent scratches of the polarizer 1 and increases the scratch resistance of the surface of the polarizing plate. The hard coat layer 2 is composed mainly of an actinic ray curable resin that is cured through a cross-linking reaction by actinic rays (also referred to as active energy rays) such as ultraviolet ray or electron beam.

The hard coat layer 2 has a pencil hardness ranging from B to H.

The pencil hardness of the hard coat layer can be determined in accordance with JIS K 5600 5-4.

Preferred actinic ray curable resins contain monomer components having ethylenically unsaturated double bonds. The resin is cured by irradiation with actinic rays such as UV rays or electron beams to form the hard coat layer 2. Typical examples of the actinic ray curable resin include UV ray curable resins and electron beam curable resins, but UV ray curable resins are preferable in view of superior mechanical strength. Preferred examples of UV ray curable resin include UV ray curable urethane acrylate resins, UV ray curable polyester acrylate resins, UV ray curable epoxy acrylate resins, UV ray curable polyol acrylate resins, and UV ray curable epoxy resins. Among these resins, most preferred are UV ray curable acrylate resins.

Preferred UV ray curable acrylate resins and polyfunctional acrylates. The polyfunctional acrylate is preferably selected from the group consisting of pentaerythritol polyacrylates, dipentaerythritol polyacrylates, pentaerythritol polymethacrylates, and dipentaerythritol polymethacrylates. The polyacrylates are compounds having two or more acryloyloxy or methacryloyloxy groups per molecule. Preferable examples of the polyacrylate compound include ethylene glycol diacrylate, diethylene glycol diacrylate, 1,6-hexanediol diacrylate, neopentylglycol diacrylate, trimethylolpropane triacrylate, trimethylolethane triacrylate, tetramethylolmethane triacrylate, tetramethylolmethane tetraacrylate, pentaglycerol triacrylate, pentaerythritol diacrylate, pentaerythritol triacrylate, pentaerythritol tetraacrylate, glycerol triacrylate, dipentaerythritol triacrylate, dipentaerythritol tetraacrylate, dipentaerythritol pentaacrylate, dipentaerythritol hexaacrylate, tris(acryloyl oxyethyl)isocyanurate, ethylene glycol dimethacrylate, diethylene glycol dimethacrylate, 1,6-hexanediol dimethacrylate, neopentylglycol dimethacrylate, trimethylolpropane trimethacrylate, trimethylolethane trimethacrylate, tetramethylolmethane trimethacrylate, tetramethylolmethane tetramethacrylate, pentaglycerol trimethacrylate, pentaerythritol dimethacrylate, pentaerythritol trimethacrylate, pentaerythritol tetramethacrylate, glycerol trimethacrylate, dipentaerythritol trimethacrylate, dipentaerythritol tetramethacrylate, dipentaerythritol pentamethacrylate, dipentaerythritol hexamethacrylate, isobornyl acrylate, and active energy ray curable isocyanurate derivatives.

The active energy ray curable isocyanurate may be any compound having one or more ethylenically unsaturated groups bonded to its isocyanuric acid skeleton. Preferred compounds have three or more ethylenically unsaturated groups and one or more isocyanurate rings per molecule.

Examples of commercially available compounds include Adeka Optomer N Series (ADEKA Corporation); SUN-RADs H-601, RC-750, RC-700, RC-600, RC-500, RC-611, and RC-612 (Sanyo Chemical Industries, Ltd.); SP-1509, SP-1507, Aronix M-6100, Aronix M-8030, Aronix M-8060, Aronix M-215, Aronix M-315, Aronix M-313, and Aronix M-327 (Toagosei Co., Ltd.); NK Ester A-TMM-3L, NK Ester AD-TMP, NK ESTER ATM-35E, NK Ester ATM-4E, NK Ester A-DOG, NK Ester A-IBD-2E, A-9300, and A-9300-1CL (Shin-Nakamura Chemical Co., Ltd.), and Light acrylate TMP-A and Light acrylate PE-3A (Kyoeisha Chemical Industry Co., Ltd.).

Monofunctional acrylates may be used for UV ray curable acrylate resins. Examples of the monofunctional acrylate include isoboronyl acrylate, 2-hydroxy-3-phenoxypropyl acrylate, isostearyl acrylate, benzyl acrylate, ethylcarbitol acrylate, phenoxyethyl acrylate, lauryl acrylate, isooctyl acrylate, tetrahydrofurfuryl acrylate, behenyl acrylate, 4-hydroxybutyl acrylate, 2-hydroxyethyl acrylate, 2-hydroxypropyl acrylate, and cyclohexyl acrylate. Such monofunctional acrylates are available from Nippon Kasei Chemical Co., Ltd., Shin-Nakamura Chemical Co., Ltd. or Osaka Organic Chemical Industry Ltd.

The monofunctional acrylate may be contained in a mass ratio of monofunctional acrylate to polyfunctional acrylate being preferably 70:30 to 98:2.

The hard coat layer 2 preferably contains a photopolymerization initiator in order to accelerate the curing of the actinic ray curable resin. The photopolymerization initiator may be contained preferably in a mass ratio of the photopolymerization initiator to the actinic ray curable resin being 20:100 to 0.01:100. Specific examples of the photopolymerization initiator include, but not limited to alkylphenones, acetophenones, benzophenones, hydroxybenzophenones, Michler's ketones, α-amyloxim esters, thioxanthones, and derivatives thereof.

Examples of the usable photopolymerization initiators may include commercially available products, preferably such as Irgacure 184, Irgacure 907, and Irgacure 651 available from BASF Japan Ltd.

The hard coat layer 2 may further contain an electrically conductive agent to take on antistatic properties. Examples of preferred electrically conductive agent include π-conjugated conductive polymers. An Ionic liquid is also preferably used as an electrically conductive compound.

The hard coat layer 2 may further contain an acrylic copolymer, a silicone surfactant, a fluorine surfactant, an anionic surfactant, or a fluorine-siloxane graft compound from the viewpoint of coating properties. The fluorine-siloxane graft polymer is a copolymerization product prepared at least by grafting a polysiloxane or organopolysiloxane containing a siloxane monomer and/or an organosiloxane monomer to a fluorine-containing resin.

The hard coat layer 2 may contain a compound having an HLB value of 3 to 18. The term "HLB value" refers to Hydrophile-Lipophile Balance which indicates the degree of hydrophilicity or lipophilicity of a compound. The lipophilicity increases as the HLB value decreases, while the hydrophilicity increases as the HLB value increases.

The hard coat layer 2 can be formed as follows: a hard coat layer composition, which contains the components for the hard coat layer diluted with solvent (hereinafter referred to as a hard coat layer coating composition), is coated on the polarizer 1, dried, and cured.

Preferred examples of the usable solvent include ketones (e.g., methyl ethyl ketone, acetone, cyclohexanone, and methyl isobutyl ketone), esters (e.g., methyl acetate, ethyl acetate, butyl acetate, propyl acetate, and propylene glycol monomethyl ether acetate), alcohols (e.g., ethanol, methanol, butanol, n-propyl alcohol, isopropyl alcohol, and diacetone alcohol), hydrocarbons (e.g., toluene, xylene, benzene, and cyclohexane), and glycol ethers (propylene glycol monomethyl ether, propylene glycol monopropyl ether, and ethylene glycol monopropyl ether). Among these solvents, preferred are ketones, esters, glycol ethers and alcohols, more preferred are glycol ethers and alcohols.

The use of a solvent in the range of 20 to 200 parts by mass relative to 100 parts by mass of the actinic ray curable resin allows convection of the resin to readily occur during a process for forming a hard coat layer while the solvent in the hard coat layer coating composition is evaporating after the hard coat layer coating composition is applied on the polarizer 1, resulting in formation of a superior hard coat layer 2.

The hard coat layer coating composition for the hard coat layer 2 is formed into appropriately 0.1 to 40 μm, preferably 0.5 to 30 μm in the wet thickness of the film. The average dry film thickness is in the range of 0.05 to 20 μm, preferably 1 to 10 μm.

The hard coat layer coating composition can be applied by any well-known wet coating process with, for example, a gravure coater, a dip coater, a reverse coater, a wire bar coater, a die coater, or an ink-jet printer. These hard coat layers can be formed such that the hard coat layer coating composition for forming a hard coat layer is applied by the above-described process, and then the resultant coating layer is dried and subjected to actinic ray curing (also referred to UV curing process) followed by heat treatment, if necessary. The heat treatment temperature after UV curing is preferably 80° C. or higher, more preferably 100° C. or higher, most preferably 120° C. or higher. The UV curing at such high temperatures can produce a hard coat layer having excellent film strength.

Any light source that emits ultraviolet rays can be used for UV curing treatment without limitation. Examples of the light source include low-pressure mercury lamps, middle-pressure mercury lamps, high-pressure mercury lamps, ultra-high-pressure mercury lamps, carbon arc lamps, metal halide lamps, and xenon lamps.

Irradiation conditions depend on the type of the lamp to be used. For example, the irradiation dose of actinic rays is in the range of 50 to 100 mJ/cm$^2$, preferably from 50 to 500 mJ/cm$^2$.

The hard coat layer 2 may also contain a UV absorber. The UV absorber, which can absorb ultraviolet rays having a wavelength of 400 nm or less, is used for the purpose of improving the durability of the polarizing plate. In particular, the UV absorber has a transmittance at 370 nm of preferably 30% or less, more preferably 20% or less, most preferably 10% or less.

Examples of the UV absorber used in the present invention includes, but are not limited to, oxybenzophenone compounds, benzotriazole compounds, salicylate ester compounds, benzophenone compounds, cyanoacrylate compounds, triazine compounds, nickel complex compounds, and inorganic powders.

The amount of the UV absorber used varies depending on several factors such as the type of the UV absorber and conditions of use, and preferably 0.5 to 10% by mass, more preferably 0.6 to 4% by mass, of the hard coat layer 2.

In the present invention, any process that enables the hard coat layer to have a pencil hardness of B to H can be used without limitation. It is preferred that the hard coat layer be composed of the UV ray curable acrylate resins described above, wherein the mass proportion of triacrylate resins (trifunctional resins) and tetraacrylate resins (tetrafunctional resins) to the total resin is 40 mass % to 90 mass %, preferably 50 mass % to 80 mass %.

The irradiation dose of actinic rays on the hard coat layer may differ depending on the compositions of curing coating solutions and lamps, but is preferably in the range of 300 to 900 mJ/cm$^2$ to achieve the aimed hardness range.

(3-1) Antiglare Treatment of Hard Coat Layer

Antiglare properties may be imparted to the hard coat layer 2 according to the process described below. Antiglare properties refer to a function to reduce the visibility of the reflected image on the surface of the hard coat layer by blurring the contour of the reflected image, causing the reflection of surrounding scenes to be less noticeable on the surface of an image display device such as a liquid crystal display, an organic EL display, and a plasma display.

(1) An embossing process. An intended uneven pattern (negative pattern) provided on a roller or plate is transferred to the hard coat layer through the embossing process.

(2) A casting process. A thermally curable resin is cast onto a roller or plate having an intended uneven pattern (negative pattern) and removed therefrom after thermal curing.

(3) A coating process. A solution of a UV or electron beam curable resin is applied onto a roller or plate having an intended uneven pattern (negative pattern), is covered with a transparent film substrate, and then is irradiated with UV rays or electron beams. The laminate of the cured resin and the transparent film is peeled off from the roller or plate.

(4) A solvent casting process using a casting belt having an intended uneven pattern (negative pattern). The pattern is transferred to the cast resin through the casting process.

(5) A printing process. An uneven pattern is formed onto a transparent substrate by printing with a photocurable or heat-curable resin, and then the resin is cured by light or heat.

(6) An inkjet process. An uneven pattern is formed onto a hard coat layer by inkjet printing with a photocurable or heat-curable resin, and then the resin is cured by light or heat to form a transparent film substrate having the uneven pattern.

(7) A combined process. An uneven pattern is formed onto the hard coat layer by ink-jet printing with a photocurable or heat-curable resin, and the resin is cured by light or heat and is covered with a transparent resin layer.

(8) A milling process. The surface of the hard coat layer is processed with a machine tool.

(9) A compression process. Spherical or polygonal particles (the particles may have any other shape) are compressed into the surface of the hard coat layer such that the particles are partially buried to be integrated in the layer to form an uneven pattern on the surface of the hard coat layer.

(10) A coating process. A dispersion containing spherical or polygonal particles (the particles may have any other shape) and a small amount of binder is applied onto the hard coat layer to form an uneven pattern on the surface of the hard coat layer.

(11) A distribution process. The hard coat layer is coated with a binder solution, and then spherical or polygonal particles (the particles may have any other shape) are distributed onto the hard coat layer to form an uneven pattern on the surface of the hard coat layer.

(12) A molding process. A mold is pressed against the surface of the hard coat layer to form an uneven pattern on the surface. The detail of this process is described in Japanese Unexamined Patent Application Publication No. 2005-156615.

Among these processes of forming an uneven pattern on the surface of the hard coat layer, effective are the processes using a negative pattern or the inkjet printing processes to impart antiglare properties to the hard coat layer.

(3-2) Antiglare Treatment of Hard Coat Layer with Translucent Fine Particulate

Translucent fine particulate may be added to actinic ray curable resins to impart antiglare properties to the hard coat layer 2 in a process of making the hard coat layer.

The translucent fine particulate is preferably composed of two or more different fine particulates to readily achieve internal haze and surface haze. A preferred combination of two or more fine particulates includes a first translucent fine particulate with an average particle size of 0.01 to 1 μm or less and a second translucent fine particulates with an average particle size of 2 to 6 μm.

The average particle size of the first translucent fine particulates is preferably 0.01 to 1 μm, more preferably 0.05 μm to 1 μm. The average particle size of the second translucent fine particulates is 2 to 6 μm, and more preferably 3 μm to 6 μm.

The first translucent fine particulates having an average particle size ranging 0.01 to 1 μm can readily provide controlled internal haze and can effectively prevent a decrease in the film strength under ozone exposure conditions. The second translucent fine particles having an average particle size ranging 2 to 6 μm can provide an excellent light scattering angle distribution, preventing blurring of displayed characters. Furthermore, no increase in thickness of the antiglare layer occurs, which results in no increase in curling and material cost. The average particle sizes can be measured, for example, with a laser diffraction particle size analyzer.

Examples of the second translucent fine particulate with an average particle size of 2 to 6 μm include acrylic particles, styrene particles, acrylic-styrene particles, melamine particles, benzoguanamine particles, and inorganic particles primarily containing silica. Preferred examples include fluorine-containing acrylic resin fine particles, poly(meth)acrylate particles, cross-linked poly(meth)acrylate particles, polystyrene particles, cross-linked polystyrene particles, and cross-linked poly(acrylic-styrene) particles. Among them, fluorine-containing acrylic resin fine particles are preferred.

Examples of the fluorine-containing acryl resin fine particles include, fine particles formed by monomers or polymers of fluorine-containing acrylate esters or methacrylate esters. Specific examples of the fluorine-containing acrylates or methacrylates includes 1H,1H,3H-tetrafluoropropyl (meth)acrylate, 1H,1H,5H-octafluoropentyl (meth)acrylate, 1H,1H,7H-dodecafluoroheptyl (meth)acrylate, 1H,1H,9H-hexadecafluorononyl (meth)acrylate, 2,2,2-trifluoroethyl (meth)acrylate, 2,2,3,3,3-pentafluoropropyl (meth)acrylate, 2-(perfluorobutyl)ethyl (meth)acrylate, 2-(perfluorohexyl)ethyl (meth)acrylate, 2-(perfluorooctyl)ethyl (meth)acrylate, 2-(perfluorodecyl)ethyl (meth)acrylate, 3-perfluorobutyl-2-hydroxypropyl (meth)acrylate, 3-perfluorohexyl-2-hydroxypropyl (meth)acrylate, 3-perfluorooctyl-2-hydroxypropyl (meth)acrylate, 2-(perfluoro-3-methylbutyl)ethyl (meth)acrylate, 2-(perfluoro-5-methylhexyl)ethyl (meth)acrylate, 2-(perfluoro-7-methyloctyl)ethyl (meth)acrylate, 3-(perfluoro-3-methylbutyl)-2-hydroxypropyl (meth)acrylate, 3-(perfluoro-5-methylhexyl)-2-hydroxypropyl (meth)acrylate, 3-(perfluoro-7-methyloctyl)-2-hydroxypropyl (meth)acrylate, 1H-1-(trifluoromethyl)trifluoroethyl (meth)acrylate, 1H,1H,3H-hexafluorobutyl (meth)acrylate, trifluoroethyl methacrylate, tetrafluoropropyl methacrylate, perfluorooctyl ethylacrylate, and 2-(perfluorobutyl)ethyl α-fluoroacrylate.

Among the fluorine-containing acryl resin fine particles, preferred are fine particles composed of 2-(perfluorobutyl) ethyl α-fluoroacrylate, fluorine-containing poly(methyl methacrylate) fine particles, and fine particles prepared by copolymerization of fluorine-containing methacrylic acid with vinyl monomer(s) in the presence of a cross-linking agent, more preferred are fluorine-containing poly(methyl methacrylate) fine particles.

The vinyl monomers copolymerizable with fluorine-containing (meth)acrylic acid have vinyl groups. Specific examples include alkyl methacrylate such as methyl methacrylate, and butyl methacrylate; alkyl acrylate such as methyl acrylate and ethyl acrylate; and styrenes such as styrene and α-methylstyrene. These may be used alone or in combination. Any cross-linking agent may be used for the polymerization reaction, and those having two or more unsaturated groups are preferred. Examples of such cross-linking agents include difunctional dimethacrylate such as ethylene glycol dimethacrylate, polyethylene glycol dimethacrylate; trimethylolpropane trimethacrylate; and divinylbenzene.

Polymerization reaction to produce fluorine-containing poly(methyl methacrylate) fine particles may be any of random copolymerization and block copolymerization. The detail of the processes is described in, for example, Japanese Unexamined Patent Application Publication No. 2000-169658.

Examples of the commercially available products of fluorine-containing acryl resin fine particles include MF-0043, available from Negami Chemical industrial Co., Ltd. The fluorine-containing acrylic resin fine particles are used alone or in combination of two or more. Furthermore, the fluorine-containing acrylic resin fine particles may be added in any form, for example, powder or emulsion.

The fluorine-containing cross-linking particles described at the paragraphs [0028] to [0055] in Japanese Unexamined Patent Application Publication No. 2004-83707 may also be used.

Examples of the polystyrene particles include commercially available products, such as SX-130H, SX-200H and SX-350H available from Soken Chemical & Engineering Co., Ltd. and SBX series (SBX-6, SBX-8) available from Sekisui Plastics Co., Ltd.

Examples of the melamine-based particles include commercially available products, such as benzoguanamine-melamine-formaldehyde condensates (brand name: EPOSTAR, grade: M30, brand name: EPOSTAR GP, grade: H40 to H110) and melamine-formaldehyde condensates (brand name: EPOSTAR, grade: S12, S6, S, and SC4), which are available from Nippon Shokubai Co., Ltd. Further examples include spherical composite particles having a core-shell structure having a silica shell on a curable melamine resin core. Such particles can be prepared by the method described in Japanese Unexamined Patent Application Publication No. 2006-171033. Specific examples thereof include commercially available products, such as composite particles of melamine resin and silica (brand name: OPTO-BEADS) available from Nissan Chemical Industries, Ltd.

Examples of the poly((meth)acrylate) particles and the crosslinked poly((meth)acrylate) particles include commercially available products, such as MX150 and MX300 available from Soken Chemical & Engineering Co., Ltd.; EPOSTAR MA (grade: MA1002, MA1004, MA1006, and MA1010) and EPOSTAR MX (emulsion) (grade: MX020W, MX030W, MX050W, and MX100W) available from Nippon Shokubai Co., Ltd.; and MBX series (MBX-8, MBX12) available from Sekisui Plastics Co., Ltd.

Specific examples of the crosslinked poly(acrylic-styrene) particles include commercially available products, such as FS-201 and MG-351 available from Nippon Paint Co., Ltd. Examples of the benzoguanamine-based particles include benzoguanamine-formaldehyde condensates (brand name: EPOSTAR, grade: L15, M05, MS, and SC25) available from Nippon Shokubai Co., Ltd.

Examples of the primary translucent microparticles having an average particle diameter of 0.01 to 1 μm include acrylic-based particles and inorganic particles composed of mainly silica. Examples of the silica particles include AEROSIL 200, 200V, and 300 available from Nippon Aerosil Co., Ltd.; AEROSIL OX50 and TT600 available from Degussa; and KEP-10, KEP-50, KEP-100 available from Nippon Shokubai Co., Ltd. Colloidal silicas may also be used. Colloidal silicas, which are colloidal suspensions of silicon dioxide in water or an organic solvent, are typically formed into, but not limited to, a spherical, needle, or moniliform shape. Examples of the colloidal silicas include commercially available products, such as SNOWTEX series available from Nissan Chemical Industries, Ltd.; CATALOID-S series available from Catalysts & Chemicals Industries Co., Ltd.; and LEVASIL series available from Bayer AG. Colloidal silicas, which are cation-exchanged with alumina sol or aluminum hydroxide, and moniliform colloidal silicas, which are composed of primary particles of silica bonded with divalent or higher-valent metal ions into moniliform, are also preferably used. Examples of the moniliform colloidal silicas include SNOWTEX-AK, SNOWTEX-PS series, and SNOWTEX-UP series available from Nissan Chemical Industries, Ltd. Specific examples thereof include IPA-ST-L (2-propanol silica sol, particle diameter of 40 to 50 nm, 30% silica concentration), MEK-ST-MS (methyl ethyl ketone silica sol, particle diameter of 17 to 23 nm, 35% silica concentration), MEK-ST (methyl ethyl ketone silica sol, particle diameter of 10 to 15 nm, 30% silica concentration), MEK-ST-L (methyl ethyl ketone silica sol, particle diameter of 40 to 50 nm, 30% silica concentration), and MEK-ST-UP (methyl ethyl ketone silica sol, particle diameter of 9 to 15 nm (chain structure), 20% silica concentration).

Examples of the acrylic-based particles include fluorine-containing acrylic resin microparticles, which are commercially available, for example, FS-701 of Nippon Paint Co., Ltd. Examples of acrylic particles include S-4000 available from Nippon Paint Co., Ltd. Examples of acrylic-styrene particles include S-1200 and MG-251 available from Nippon Paint Co., Ltd.

Among the primary translucent microparticles having an average particle diameter of 0.01 to 1 μm, preferred are fluorine-containing acrylic resin microparticles.

The content of the secondary translucent microparticles having an average particle diameter of 2 to 6 μm is preferably 0.01 to 500 parts by mass, more preferably 0.1 to 100 parts by mass, particularly preferably 1 to 60 parts by mass relative to 100 parts by mass of an active ray curable resin to achieve the stability of a hard coat layer coating solution for imparting antiglare property and the dispersibility of a dispersion liquid.

The content of the primary translucent microparticles having an average particle diameter of 0.01 to 1 μm is preferably within a range of 0.01 to 500 parts by mass, more preferably within a range of 0.1 to 100 parts by mass relative to 100 parts by mass of an active ray curable resin to achieve the stability of a hard coat layer coating solution for imparting antiglare property and the dispersibility of a dispersion liquid.

The ratio of the primary translucent microparticles to the secondary translucent microparticles (=the primary translucent microparticles:the secondary translucent microparticles) is preferably within a range of 1.0:1.0 to 3.0:1.0. Use of two types of microparticles having different particle diameters, which are contained in accordance with this ratio, can effectively prevent a decrease in film strength after the durability test, e.g., by exposure to ozone.

The translucent microparticles in any form (e.g., powder and emulsion) may be added. The density of the translucent microparticles is preferably in a range of 10 to 1,000 mg/m$^2$, more preferably 100 to 700 mg/m$^2$.

In order to impart antiglare characteristics to the hard coat layer 2, ultraviolet curable resin compositions, such as silicone-based, polystyrene-based, polycarbonate, polyolefin-based, polyester-based, polyamide-based, polyimide-based, and polyfluorinated ethylene-based resin powder may also be added. Moreover, microparticles described in Japanese Unexamined Patent Application Publication No. 2000-241807 may optionally be added.

The translucent microparticles have a refractive index of preferably 1.45 to 1.70, more preferably 1.45 to 1.65. The refractive index can be determined as follows: Equal amounts of translucent microparticles are dispersed in solvent mixtures having different refractive indices, the mixtures being prepared by mixing two solvents having different refractive indices in different proportions. Among the dispersions, the refractive index of a dispersion having the lowest turbidity measured with an Abbe refractometer is determined to be the refractive index of the translucent microparticles.

The absolute value of the difference in the refractive indices between the translucent microparticles and an active ray curable translucent resin, i.e., (the refractive index of the translucent microparticles–the refractive index of the translucent resin), is 0.001 to 0.100, preferably 0.001 to 0.050, more preferably 0.001 to 0.040, still more preferably 0.001 to 0.030, particularly preferably 0.001 to 0.020, most preferably 0.001 to 0.015. The type and the compounding ratio of the translucent resin and the translucent microparticles may be appropriately selected to control the difference in the refractive index to be within the above-mentioned range. It is preferred that the selection be experimentally determined. A difference within the above range can prevent problems, such as blurred letters on a film, low contrast in a darkroom, and cloudiness on a surface.

In specific, a preferred combination for a translucent resin composition for a hard coat layer is composed of a curable translucent acrylate-based resin and having a refractive index of 1.50 to 1.53 after curing and acrylic-based translucent microparticles. Particularly preferred combinations are a curable translucent acrylate-based resin having a refractive index of 1.50 to 1.53 after curing and translucent microparticles (refractive index of 1.48 to 1.54) composed of acrylic-based microparticles and a crosslinked poly(styrene-acrylic) copolymer; and a curable translucent acrylate-based resin having a refractive index of 1.50 to 1.53 after curing and acrylic-based translucent microparticles and fluorine-containing acrylic resin microparticles (refractive index of 1.45 to 1.47).

<<Antireflection Layer>>

An antireflection layer, such as a low refractive index layer or a high refractive index layer, may optionally be disposed on the hard coat layer 2.

The low refractive index layer is preferably provided, for example, through applying a coating solution containing hollow silica-based particles having a shell and a porous core or cavity.

The details of a low refractive index layer and a high refractive index layer are described in paragraphs [0187] to [0266] of International Publication No. WO 2008/050576.

(4) Retardation Film

A retardation film 3 is preferably disposed on a second surface of the polarizer 1.

The retardation film 3 can compensate optically for changes in contrast and color tone on a liquid crystal display with a viewing angle. The required retardation, however, differs depending on a liquid crystal display mode. The retardation may be appropriately selected for any liquid crystal display apparatus.

In a vertical alignment (VA, including MVA and PVA) mode, a transparent protective film on at least one of polarizing plates (adjacent to a cell) preferably has retardation. Specifically, the preferred retardation is represented by Re =0 to 240 nm and Rth=0 to 500 nm. Preferred relations between three-dimensional refractive indices are nx>ny=nz, nx>ny >nz, nx>nz>ny, and nx=ny>nz (uniaxial, biaxial, Z conversion, and negative C plate). If polarizing plates are disposed on the upper and lower sides of a liquid crystal cell, both the upper and lower sides of the cell may have retardation, or any one of the transparent protective films at the upper and lower sides may have retardation.

nx represents a refractive index in a direction x in which the refractive index is maximum in the in-plane direction of a film. ny represents a refractive index in a direction y orthogonal to the direction x in the in-plane direction of a film. nz represents a refractive index in a thickness direction z of a film.

In an in-plane switching (IPS, including FFS) mode, any one of or none of the transparent protective films on polarizing plates may have retardation. If none of the transparent protective films has retardation, both the upper and lower sides of a liquid crystal cell (adjacent to a cell) have preferably no retardation. If one or both of the transparent protective films have retardation, both or any one of the upper and lower sides of a liquid crystal cell preferably has retardation (for example, Z conversion on an upper side and no retardation on a lower side; A plate on an upper side and positive C plate on a lower side). The preferred retardation is represented by Re =−500 to 500 nm and Rth=−500 to 500 nm. Preferred relations between the three-dimensional refractive indices are nx>ny =nz, nx>nz>ny, nz>nx=ny, and nz>nx>ny (uniaxial, Z conversion, positive C plate, and positive A plate).

A film having retardation may be separately prepared and laminated with a transparent protective film having no retardation into a film having the above function.

The polarizing plate of the present invention is preferably used in a VA mode. The retardation film 3 preferably satisfies the condition defined by the following expression (1):

$$7.5 \times 10^{-4} \leq (nx - ny) \leq 4.5 \times 10^{-3} \qquad \text{Expression (1)}$$

where nx represents a refractive index in a direction x in which the refractive index is maximum in the in-plane direction of a film; and ny represents a refractive index in a direction y orthogonal to the direction x in the in-plane direction of a film.

Birefringence and a retardation value of a film can be measured with, but not limited to, an automatic double refractometer (brand name: KOBRA-21ADH available from Oji Scientific Instruments).

Examples of the material for the retardation film 3 include birefringent films prepared by stretching polymer films made of cellulose resins, such as triacetyl cellulose (TAC), and other resins, such as polyester, polycarbonate, norbornene, polyamide, polyimide, polyethersulfone, polysulfone, polystyrene, acrylic, acetate, and polyolefin-based resins; oriented liquid crystal polymer films; and laminates of substrate films and oriented liquid crystal polymer layers.

Although any material satisfying the predetermined condition may be used for the retardation film 3, at least one selected from cellulose resins, polycarbonate resins, cyclic polyolefin resins, and (meth)acrylic resins is preferably used. More preferred are cellulose resins.

The retardation film 3 may be selected from various wave plates (e.g., ½λ plates and ¼λ plates), color compensating films by birefringence of liquid crystal layers, and viewing angle compensating films, e.g., films widening the viewing angle.

The surface of the retardation 3 may be saponified with, e.g., alkali to increase adhesion to a polarizer. Alternatively, any proper primer may be applied to the surface. Preferred are urethane-based primers and silicon-based primers.

The retardation film 3 has a thickness ranging, for example, from 1 to 500 μm, preferably from 5 to 200 μm, more preferably from 10 to 150 μm. The retardation film 3 has a transmittance of preferably 90% or more at a wavelength of 590 nm.

Particularly preferred retardation films according to the present invention are cellulose ester films described in paragraphs [0030] to [0232] of Japanese Unexamined Patent Application Publication No. 2010-215879.

(5) Production of Polarizing Plate

A method of producing a polarizing plate will now be described. FIG. 2A is an explanatory diagram showing an exemplary process of producing a polarizing plate by coating a stretching substrate. FIG. 2B is an explanatory diagram showing an exemplary process of producing a polarizing plate using a PVA master roll instead of a stretching substrate.

(5-1) Method of Producing Polarizing Plate Using Stretching Substrate

A stretching substrate is used in forming the polarizer 1 by a coating process (refer to FIG. 2A).

(1) A surface of a thermoplastic resin substrate B as a stretching substrate is corona-treated. Examples of the material for the thermoplastic resin substrate B include polyethylene terephthalate, polypropylene, and triacetyl cellulose.

(2) The thermoplastic resin substrate B (stretching substrate) is then coated with, for example, a poly(vinyl alcohol) aqueous solution which is then dried to form a hydrophilic polymer layer 1a on the substrate B.

(3) The laminate of the hydrophilic polymer layer 1a on the thermoplastic resin substrate B is then stretched to, for example, 2 to 7 times its original length such that the hydrophilic polymer layer 1a has a thickness ranging from 0.5 μm to 10 μm. Although the laminate of the thermoplastic resin substrate B and the hydrophilic polymer layer 1a is preferably stretched in the machine direction (MD) without fixing the transverse ends, any technique may be used. For example, the laminate may be stretched with a tenter in the transverse direction (TD).

(4) The laminate of the hydrophilic polymer layer 1a and the thermoplastic resin substrate B is then immersed in a dyeing solution containing dichroic pigment to dye the hydrophilic polymer layer 1a with the dichroic pigment. The area of the hydrophilic polymer layer 1a dyed with the dichroic pigment has a thickness ranging from, for example, 0.5 to 2 μm.

The stretching and dyeing steps may be executed in any order on the hydrophilic polymer layer 1a; the hydrophilic polymer layer 1a may be dyed after the stretching step or stretched after the dyeing step.

The stretched and dyed hydrophilic polymer layer 1a functions as a polarizer 1.

(5) A coating film 2a for a hard coat layer is then formed on a first surface (dyed with a dichroic dye) of the polarizer 1 by applying and then drying a hard coat layer coating composition containing an active ray curable resin.

(6) The coating film 2a for a hard coat layer is then irradiated with UV light as active rays to form a hard coat layer 2 having a thickness ranging from 1 to 5 μm and a pencil hardness ranging from B to H.

(7) The thermoplastic resin substrate B is then removed from the back surface of the polarizer 1 to produce a polarizing plate 10. A polarizing plate 11 can be produced by bonding the retardation film 3 on the surface of the polarizing plate 10 which is opposite to the surface provided with the hard coat layer 2.

(5-2) Method of Producing Polarizing Plate without Stretching Substrate (1) A polarizer 1 without a stretching substrate, is formed with, for example, a hydrophilic polymer film such as a PVA master roll (hydrophilic polymer layer) (refer to FIG. 2B). The hydrophilic polymer film is a polymeric film composed of mainly, for example, poly(vinyl alcohol).

(2) The hydrophilic polymer film 1a is stretched to, for example, 2 to 7 times its original length such that the hydrophilic polymer film 1a has a thickness ranging from 0.5 μm to 10 μm. Although the hydrophilic polymer film 1a is preferably stretched in the machine direction (MD) without fixing the transverse ends, any technique may be used. For example, the hydrophilic polymer film 1a may be stretched with a tenter in the transverse direction (TD).

(3) The hydrophilic polymer film 1a is then immersed in a dyeing solution containing dichroic pigment to dye the hydrophilic polymer film 1a with the dichroic pigment. The area of the hydrophilic polymer film 1a dyed with the dichroic pigment has a thickness ranging from, for example, 0.5 to 2 μm.

The stretching and dyeing steps may be executed in any order on the hydrophilic polymer film 1a; the hydrophilic polymer film 1a may be dyed after the stretching step or stretched after the dyeing step.

The stretched and dyed hydrophilic polymer film 1a functions as a polarizer 1.

(4) A coating film 2a for a hard coat layer is then formed on a first surface (dyed with a dichroic dye) of the polarizer 1 by applying and then drying a hard coat layer coating composition containing an active ray curable resin.

The coating film 2a for a hard coat layer is then irradiated with UV light as active rays to form a hard coat layer 2 having a thickness ranging from 1 to 5 μm and a pencil hardness ranging from B to H.

(5) After the irradiation with UV light, (6) a polarizing plate 10 is produced. A polarizing plate 11 can be produced by bonding the retardation film 3 on the surface of the polarizing plate 10 which is opposite to the surface provided with the hard coat layer 2.

(6) Overview of Image Display Device

Overview of an image display device provided with a polarizing plate 10 or 11 will now be described.

For example, an image display device may be provided with the polarizing plate(s) 10 or 11 of the present invention to prepare various image display devices having excellent visibility.

Figure 3:
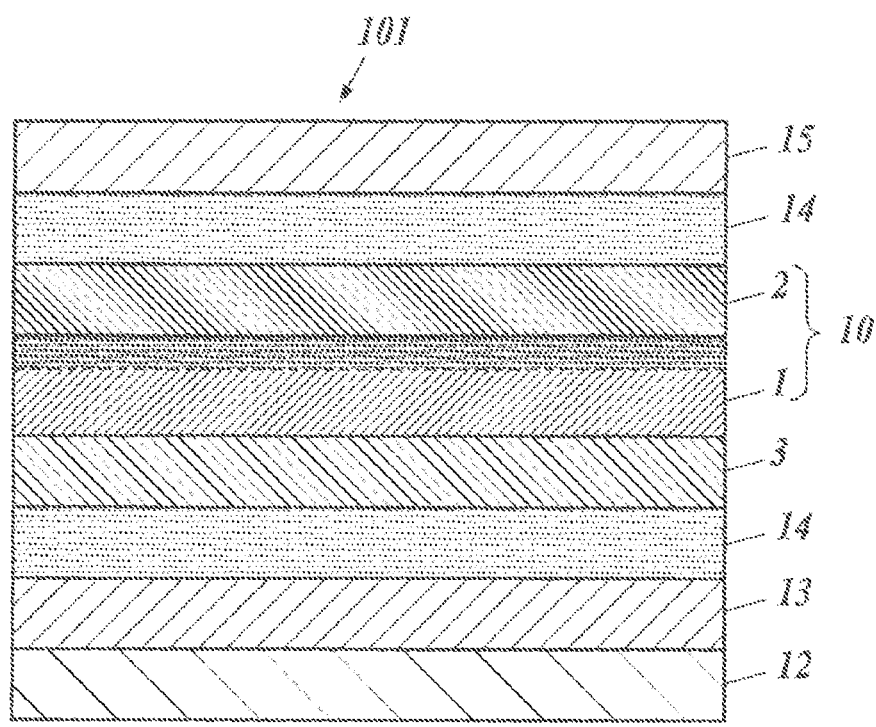
FIG. 3 is a schematic diagram showing an example organic EL display device with a touch panel as an image display device.

FIG. 3 is a schematic diagram showing an exemplary organic EL display device with a touch panel, which is an image display device 101.

The image display device 101 is provided with a polarizing plate 10, which is bonded with an adhesive 14 on a touch panel 13 disposed on an organic EL element 12. The polarizing plate 10 is provided with a retardation film (λ/4 plate) 3, which is bonded to a polarizer 1 of the polarizing plate 10. A glass cover 15 is bonded on a hard coat layer 2 of the polarizing plate 10 with the adhesive 14.

Figure 4:
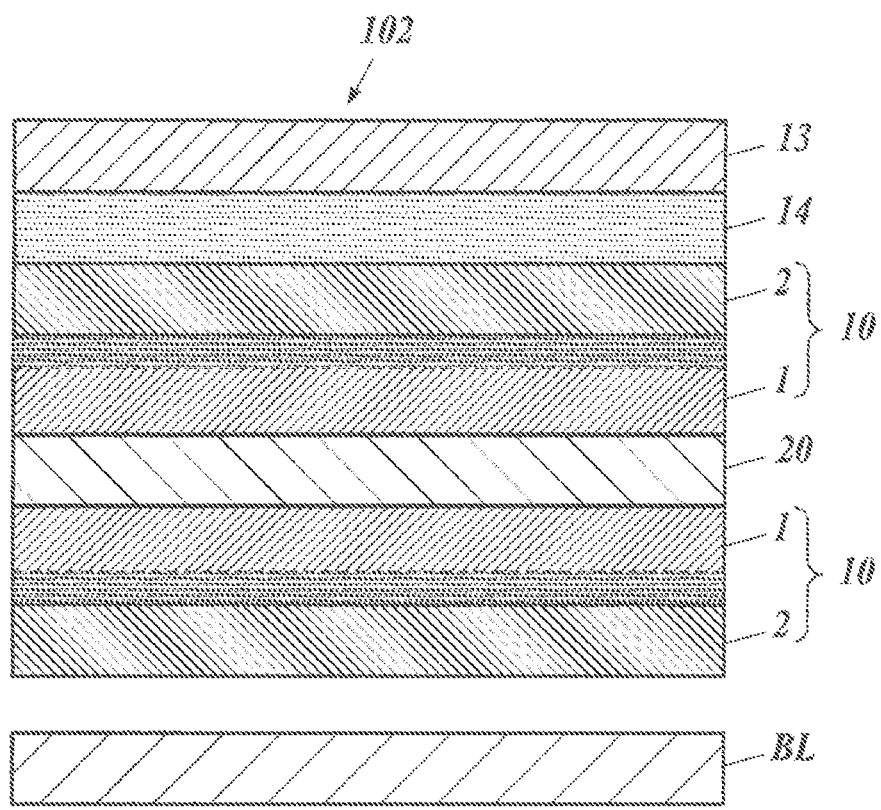
FIG. 4 is a schematic diagram showing an example IPS liquid crystal display device with a touch panel as an image display device.

FIG. 4 is a schematic diagram showing an exemplary IPS liquid crystal display device with a touch panel, which is an image display device 102.

The image display device 102 is composed of polarizing plates 10, which are respectively disposed on both surfaces of an IPS liquid crystal panel 20, and a touch panel 13 bonded with an adhesive 14 to a hard coat layer 2 of one of the polarizing plates 10. A backlight unit BL is provided on the other polarizing plate 10.

Figure 5:
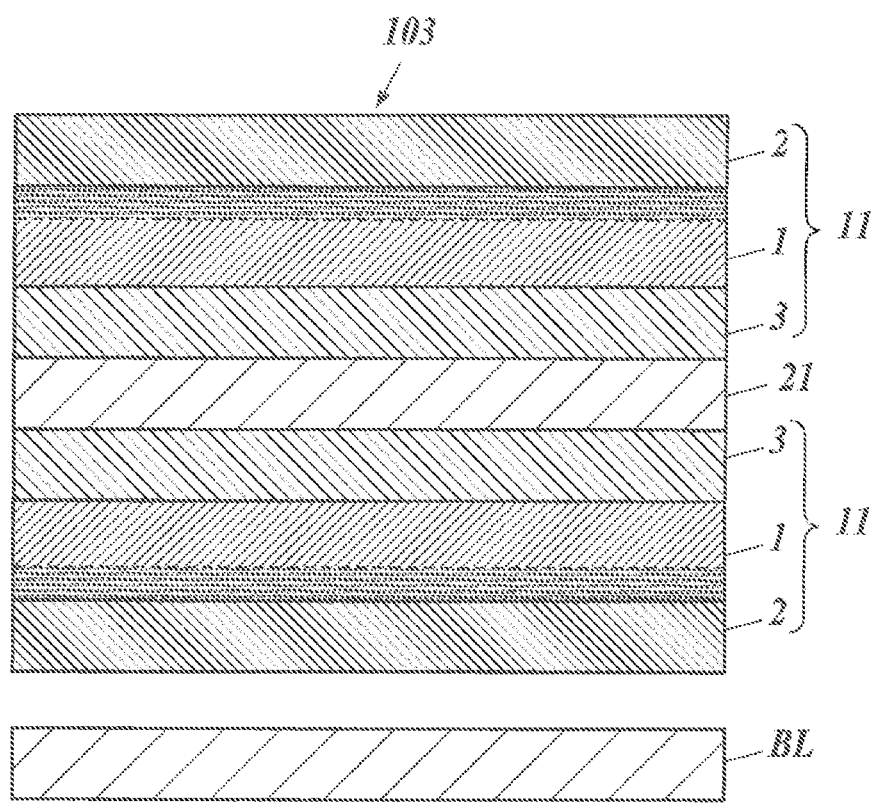
FIG. 5 is a schematic diagram showing an example VA liquid crystal display device.

FIG. 5 is a schematic diagram showing an exemplary VA liquid crystal display device, which is an image display device 103.

The image display device 103 is composed of polarizing plates 11, which are respectively disposed on both surfaces of a VA liquid crystal panel 21, and a backlight unit BL.

FIG. 6 is a schematic diagram showing an exemplary VA liquid crystal display device with a touch panel, which is an image display device 104.

The image display device 104 is composed of polarizing plates 11, which are respectively disposed on both surfaces of a VA liquid crystal panel 21, and a touch panel 13 bonded with an adhesive 14 to a hard coat layer 2 of one of the polarizing plates 11. A backlight unit BL is provided on the other polarizing plate 11.

It is not preferred that the polarizing plate of the image display device of the present invention be disposed at the outermost surface, which requires scratch resistance, since the polarizing plate of the present invention has a pencil hardness ranging from B to H. The polarizing plate should preferably be disposed on a light source. If the polarizing plate is disposed on a viewing side, the image display device is provided with any other member on the other surface as shown in FIGS. 3, 4, and 6.

Embodiment Examples

Specific examples of the present invention will now be described. The present invention, however, should not be limited to these examples. The sign "%" used in the examples refers to "mass %", unless otherwise specified.

1. Preparation of Polarizer (Production Example 1, Production of Polarizer No. 1)

A poly(vinyl alcohol) film of 30 μm thickness was uniaxially stretched in the machine direction (MD) at a stretching ratio of 5.7 times in a dry process at 125° C.

Under a predetermined tension, the stretched poly(vinyl alcohol) film was immersed in an aqueous solution containing 0.05 parts by mass of iodine and 5 parts by mass of potassium iodide relative to 100 parts by mass of water for 60 seconds at 28° C. Under a predetermined tension, the resulting film was then immersed in an aqueous boric acid solution containing 7.5 parts by mass of boric acid and 6 parts by mass of potassium iodide relative to 100 parts by mass of water for 300 seconds at 73° C. The resulting film was then washed with pure water of 15° C. for 10 seconds and dried for 300 seconds at 70° C. under a predetermined tension. The end of the resulting film was cut off to prepare a polarizer No. 1 (polarizing film) of a 1,300 mm width. The thickness of the polarizer No. 1 (polarizing film) was 10 μm.

(Production Example 2, Production of Polarizer No. 2)
<Coating Process>

The surface of an antistatic-treated amorphous poly(ethylene terephthalate) film of 120 μm thickness was corona-treated to prepare a substrate film.

An aqueous 8 mass % poly(vinyl alcohol) solution was prepared by dissolving poly(vinyl alcohol) powder (available from JAPAN VAM & POVAL CO., LTD., average degree of polymerization: 2,500, degree of saponification: 99.0 mol % or more, brand name: JC-25) in hot water of 95° C.

The resulting aqueous poly(vinyl alcohol) solution was applied on the substrate film with a lip coater and then dried at 80° C. for 20 minutes into a laminate of a substrate film (resin substrate) and a poly(vinyl alcohol) resin layer (hydrophilic polymer layer). The thickness of the poly(vinyl alcohol)-based resin layer in the laminate was 20.1 μm.
<Stretching Process>

The resulting laminate was uniaxially stretched at 160° C., at a stretching ratio of 5.3 times in the machine direction (MD) without fixing the transverse ends. The thickness of the poly(vinyl alcohol) resin layer in the stretched laminate was 10 μm.
<Dyeing Process>

The stretched laminate was immersed in a warm water bath of 60° C. for 60 seconds and then immersed in an aqueous solution containing 0.05 parts by mass of iodine and 5 parts by mass of potassium iodide relative to 100 parts by mass of water for 60 seconds at 28° C. The laminate was then immersed in an aqueous boric acid solution containing 7.5 parts by mass of boric acid and 6 parts by mass of potassium iodide relative to 100 parts by mass of water for 300 seconds at 73° C., under a predetermined tension. The laminate was then washed with pure water of 15° C. for 10 seconds and dried at 70° C. for 300 seconds under a predetermined tension to prepare a laminate of a substrate film and a polarizer No. 2. The thickness of the polarizer No. 2 was 10 μm.

(Production Example 3, Production of Polarizer No. 3)

A polarizer No. 3 was prepared as in Production Example 2 except that the thickness of the poly(vinyl alcohol)-based resin layer in the laminate of the substrate film (resin substrate) and the poly(vinyl alcohol) resin layer (hydrophilic polymer layer) was 9.8 μm. The thickness of the polarizer No. 3 was 4 μm.

(Production Example 4, Production of Polarizer No. 4)

A polarizer No. 4 was prepared as in Production Example 2 except that the thickness of the poly(vinyl alcohol)-based resin layer in the laminate of the substrate film (resin substrate) and the poly(vinyl alcohol) resin layer (hydrophilic polymer layer) was 12.0 μm. The thickness of the polarizer No. 4 was 5 μm.

(Production Example 5, Production of Polarizer No. 5)

A polarizer No. 5 was prepared as in Production Example 2 except that the thickness of the poly(vinyl alcohol)-based resin layer in the laminate of the substrate film (resin substrate) and the poly(vinyl alcohol) resin layer (hydrophilic polymer layer) was 1.5 μm. The thickness of the polarizer No. 5 was 0.5 μm.

(Production Example 6, Production of Polarizer No. 6)

A polarizer No. 6 was prepared as in Production Example 2 except that the thickness of the poly(vinyl alcohol)-based resin layer in the laminate of the substrate film (resin substrate) and the poly(vinyl alcohol) resin layer (hydrophilic polymer layer) was 7.5 μm. The thickness of the polarizer No. 6 was 4 μm.

(Production Example 7, Production of Polarizer No. 7)

A polarizer No. 7 was prepared as in Production Example 2 except that the thickness of the poly(vinyl alcohol)-based resin layer in the laminate of the substrate film (resin substrate) and the poly(vinyl alcohol) resin layer (hydrophilic polymer layer) was 0.4 μm. The thickness of the polarizer No. 7 was 0.2 μm.

Production Example 8, Production of Polarizer No. 8)

A polarizer No. 8 was prepared as in the polarizer No. 1 except that a poly(vinyl alcohol) film of 75 μm thickness (available from KURARAY CO., LTD., Vinylon #7500) was uniaxially stretched in the machine direction (MD) at a stretching ratio of 5.2 times in a dry process at 125° C. The thickness of the polarizer No. 8 was 30 μm.

EXAMPLE 1

<<Preparation of Polarizing Plate No. 101>>

A polarizing plate No. 101 was prepared by the procedures described below.

A coating film for a hard coat layer was formed by applying a hard coat layer coating solution "1" prepared as described below, which was filtrated through a 0.4 μm-pore diameter polypropylene filter, with a die coater on the polarizer No. 1. After being dried at 70° C., the coating film was cured at an ultraviolet-lamp light intensity of 300 mW/cm$^2$ with an exposure dose of 0.3 J/cm$^2$ while purging with nitrogen to provide an atmosphere having an oxygen concentration of 1.0% by volume or less. The coating film was further heated through a heat-treatment zone at 130° C. for 5 minutes at a conveying tension of 300 N/m to form a 15.0 μm-thick dried film for a hard coat layer on the polarizer No. 1 into a polarizing plate No. 101, which was then wound up into a roll.

(Production of Hard Coat Layer Coating Solution "1")

The following components were mixed with stirring to prepare a hard coat layer coating solution "1" (refer to Table 1).

| Hard coat layer coating solution "1" | |
|---|---|
| Pentaerythritol tetraacrylate | 30 parts by mass |
| Dipentaerythritol hexaacrylate | 60 parts by mass |
| Dipentaerythritol penta acrylate | 50 parts by mass |
| IRGACURE 184 (available from BASF Corp.) | 5 parts by mass |
| IRGACURE 907 (available from BASF Corp.) | 5 parts by mass |
| Fluorine-siloxane graft polymer I (35 mass %, see below) | 5 parts by mass |
| SEAHOSTAR KE-P50 (powdery silica particles, average particle diameter: 0.47 to 0.61 μm, available from Nippon Shokubai Co., Ltd.) | 24.3 parts by mass |
| Propylene glycol monomethyl ether | 20 parts by mass |
| Methyl acetate | 40 parts by mass |
| Methyl ethyl ketone | 60 parts by mass |

<Materials for Preparing Fluorine-Siloxane Graft Polymer I>

Brand names of the materials used for preparing fluorine-siloxane graft polymer I are as follows:

1) Radical polymerizable fluororesin (A): CEFRAL COAT CF-803 (hydroxyl group value: 60, number average molecular weight: 15,000, available from Central Glass Co., Ltd.)

The synthetic process of radical polymerizable fluororesin (A) is as follows:

A glass reactor equipped with a mechanical stirrer, a thermometer, a condenser, and a dry nitrogen gas inlet was charged with CEFRAL COAT CF-803 (1,554 parts by mass), xylene (233 parts by mass), and 2-isocyanatoethyl methacrylate (6.3 parts by mass) and heated to 80° C. in a dried nitrogen atmosphere. The mixture was reacted at 80° C. for 2 hours. After no absorption band assigned to isocyanate was observed in an infrared absorption spectrum of a reaction product sample, the reacted mixture contained 50 mass % radical polymerizable fluororesin (A) with urethane bonds was taken out.

2) Single end radical polymerizable polysiloxane (B): Silaplane FM-0721 (number average molecular weight: 5,000, available from CHISSO CORPORATION)

3) Radical polymerization initiator: PERBUTYL O (t-butyl peroxy-2-ethylhexanoate, available from NOF CORPORATION)

4) Curing agent: SUMIDUR N3200 (biuret prepolymer of hexamethylene diisocyanate, available from Sumika Bayer Urethane Co., Ltd.)

<Preparation of Fluorine-Siloxane Graft Polymer I>

A glass reactor equipped with a mechanical stirrer, a thermometer, a capacitor, and a dry nitrogen gas inlet was charged with the radical polymerizable fluororesin (A) synthesized above (26.1 parts by mass), xylene (19.5 parts by mass), n-butyl acetate (16.3 parts by mass), methyl methacrylate (2.4 parts by mass), n-butyl methacrylate (1.8 parts by mass), lauryl methacrylate (1.8 parts by mass), 2-hydroxyethyl methacrylate (1.8 parts by mass), single-end radical polymerizable polysiloxane (B): FM-0721 (5.2 parts by mass), and a radical polymerization initiator: PERBUTYL O (0.1 parts by mass) and heated to 90° C. in a nitrogen atmosphere. The mixture was then kept at 90° C. for 2 hours. After further PERBUTYL O (0.1 parts by mass) was added, the mixture was kept at 90° C. for 5 hours into a solution of 35 mass % fluorine-siloxane graft polymer I having a weight average molecular weight of 171,000. The weight average molecular weight was determined by GPC. The mass percent of the fluorine-siloxane graft polymer I was determined by a liquid chromatography (HPLC).

TABLE 1

Unit: Part by mass

| | Hard coat layer | | | | | |
|---|---|---|---|---|---|---|
| Compounds | Coating solution 1 | Coating solution 2 | Coating solution 3 | Coating solution 4 | Coating solution 5 | Coating solution 6 |
| Pentaerythritol triacrylate (PETRA) | — | — | 20 | 30 | 40 | 50 |
| Pentaerythritol tetraacrylate (PETA) | 30 | 40 | 50 | | 40 | — |
| Dipentaerythritol hexaacrylate (DPHA) | 60 | 60 | 30 | 20 | — | — |
| Dipentaerythritol pentaacrylate (DPPA) | 50 | 40 | 30 | 30 | 30 | — |
| Pentaerythritol ethoxy tetraacrylate (PE(EO)TTA) | — | 20 | — | 20 | 20 | — |
| Ditrimethylolpropane tetraacrylate (DTMPTA) | — | — | — | 20 | — | — |
| Dipropylene glycol diacrylate (DPGDA) | — | — | — | — | — | 50 |
| IRGACURE 184 (available from BASF Corp.) | 5 | 5 | 5 | 5 | 5 | 5 |
| IRGACURE 907 (available from BASF Corp.) | 5 | 2 | 2 | 2 | 2 | 2 |
| TINUVIN 928 (available from BASF Corp.) | — | — | — | 7 | 7 | 7 |
| Fluorine-siloxane graft polymer 1 (35% by mass) | 5 | 5 | 5 | 5 | 5 | 5 |
| SEAHOSTAR KEP-50 | 24.3 | 24.3 | 24.3 | 24.3 | 24.3 | 24.3 |
| Propylene glycol monomethyl ether | 20 | 20 | 20 | 20 | 20 | 20 |
| Methyl acetate | 40 | 40 | 40 | 40 | 40 | 20 |
| Methyl ethyl ketone | 60 | 60 | 60 | 60 | 60 | 30 |

<<Preparation of Polarizing Plate No. 102>>

A hard coat layer was formed on the polarizer No. 2 as in the polarizing plate No. 101 except that a hard coat layer coating solution "2" containing the components shown in Table 1 was applied onto the laminate of the substrate film and the polarizer No. 2 and then cured with ultraviolet rays with an exposure dose shown in Table 2. The substrate film was removed from the resulting laminate to prepare a polarizing plate No. 102, which was then wound up into a roll. The thickness of the dried film for the hard coat layer of the polarizing plate No. 102 was 10.0 μm. The substrate film was readily removed.

<<Preparation of Polarizing Plate No. 103>>

A hard coat layer was formed on the polarizer No. 1 as in the polarizing plate No. 101 except that a hard coat layer coating solution "3" containing the components shown in Table 1 was applied onto the polarizer No. 1 and then cured with ultraviolet rays with an exposure dose shown in Table 2 to prepare a polarizing plate No. 103. The thickness of the dried film for the hard coat layer of the polarizing plate No. 103 was 10.0 μm.

<<Preparation of Polarizing Plate No. 104>>

A hard coat layer was formed on the polarizer No. 3 in the laminate of the substrate film and the polarizer as in the polarizing plate No. 102 except that a hard coat layer coating solution "4" containing the components shown in Table 1 was applied onto the polarizer No. 3 and then cured with ultraviolet rays with an exposure dose shown in Table 2 to prepare a polarizing plate No. 104. The thickness of the dried film for the hard coat layer of the polarizing plate No. 104 was 10.0 μm.

<<Preparation of Polarizing Plate No. 105>>

A hard coat layer was formed on the polarizer No. 3 in the laminate of the substrate film and the polarizer as in the polarizing plate No. 102 except that a hard coat layer coating solution "5" containing the components shown in Table 1 was applied onto the polarizer No. 3 and then cured with ultraviolet rays with an exposure dose shown in Table 2 to prepare a polarizing plate No. 105. The thickness of the dried film for the hard coat layer of the polarizing plate No. 105 was 10.0 μm.

<<Preparation of Polarizing Plate No. 106>>

A hard coat layer was formed on the polarizer No. 3 in the laminate of the substrate film and the polarizer as in the polarizing plate No. 102 except that a hard coat layer coating solution "4" containing the components shown in Table 1 was applied onto the polarizer No. 3 and then cured with ultraviolet rays with an exposure dose shown in Table 2 to prepare a polarizing plate No. 106. The thickness of the dried film for the hard coat layer of the polarizing plate No. 106 was 4.0 μm.

<<Preparation of Polarizing Plate No. 107>>

A hard coat layer was formed on the polarizer No. 3 in the laminate of the substrate film and the polarizer as in the polarizing plate No. 102 except that a hard coat layer coating solution "4" containing the components shown in Table 1 was applied onto the polarizer No. 3 and then cured with ultraviolet rays with an exposure dose shown in Table 2 to prepare a polarizing plate No. 107. The thickness of the dried film for the hard coat layer of the polarizing plate No. 107 was 4.0 μm.

<<Preparation of Polarizing Plate No. 108>>

A hard coat layer was formed on the polarizer No. 4 in the laminate of the substrate film and the polarizer as in the polarizing plate No. 102 except that a hard coat layer coating solution "4" containing the components shown in Table 1 was applied onto the polarizer No. 4 and then cured with ultraviolet rays with an exposure dose shown in Table 2 to prepare a polarizing plate No. 108. The thickness of the dried film for the hard coat layer of the polarizing plate No. 108 was 4.0 μm.

<<Preparation of Polarizing Plate No. 109>>

A hard coat layer was formed on the polarizer No. 5 in the laminate of the substrate film and the polarizer as in the polarizing plate No. 102 except that a hard coat layer coating solution "4" containing the components shown in Table 1 was applied onto the polarizer No. 5 and then cured with ultraviolet rays with an exposure dose shown in Table 2 to prepare a polarizing plate No. 109. The thickness of the dried film for the hard coat layer of the polarizing plate No. 109 was 4.0 μm.

<<Preparation of Polarizing Plate No. 110>>

After a masking film (E-MASK HR6030, a surface protective material available from Nitto Denko Corporation) was bonded on the polarizer No. 6 of the laminate, the substrate film was removed from the laminate. A hard coat layer coating solution "4" containing the components shown in Table 1 was then applied onto a surface (not dyed with iodine) of the polarizer in the laminate of the masking film and the polarizer and cured with ultraviolet rays with an exposure dose shown in Table 2 into a hard coat layer. The masking film was removed from the laminate to prepare a polarizing plate No. 110. The thickness of the dried film for the hard coat layer of the polarizing plate No. 110 was 4.0 μm.

<<Preparation of Polarizing Plate No. 111>>

A hard coat layer was formed on the polarizer No. 7 in the laminate of the substrate film and the polarizer as in the polarizing plate No. 102 except that a hard coat layer coating solution "4" containing the components shown in Table 1 was applied onto the polarizer No. 7 and then cured with ultraviolet rays with an exposure dose shown in Table 2 to prepare a polarizing plate No. 111. The thickness of the dried film for the hard coat layer of the polarizing plate No. 111 was 4.0 μm.

<<Preparation of Polarizing Plate No. 112>>

A hard coat layer was formed on the polarizer No. 4 in the laminate of the substrate film and the polarizer as in the polarizing plate No. 102 except that a hard coat layer coating solution "6" containing the components shown in Table 1 was applied onto the polarizer No. 4 and then cured with ultraviolet rays with an exposure dose shown in Table 2 to prepare a polarizing plate No. 112. The thickness of the dried film for the hard coat layer of the polarizing plate No. 112 was 4.0 μm.

<<Preparation of Polarizing Plate No. 113>>

A hard coat layer was formed on the polarizer No. 8 as in the polarizing plate No. 101 except that a hard coat layer coating solution "4" containing the components shown in Table 1 was applied onto the polarizer No. 8 and then cured with ultraviolet rays with an exposure dose shown in Table 2 to prepare a polarizing plate No. 113. The thickness of the dried film for the hard coat layer of the polarizing plate No. 113 was 4.0 μm.

<<Evaluation of Polarizing Plate>>

Each of the polarizing plates (No. 101 to 113) was evaluated as follows:

(Surface Properties: Measurement of Pencil Hardness of Hard Coat Layer)

The polarizing plates were cut into test pieces in a size of 50 mm×150 mm. After the test pieces were placed not so as to overlap and were humidified under an environment at 25° C. and a relative humidity of 65% for 24 hours, the pencil hardness of the hard coat layer in the polarizing plate was measured under a load of 1 kg in accordance with JIS K 5600 5-4.

(Early Performance: Measurement of Degree of Polarization)

Each of the polarizing plates was cut into a size of a 42-inch liquid crystal panel (930 mm×520 mm) and left under an environment at 23° C. and a relative humidity of 55% for 24 hours. The cut polarizing plate was then bonded with a 25-μm double-sided adhesive tape (a substrate-free tape available from Lintec Corporation, MO-3005C) onto a surface, which was preliminarily cleaned with ethanol, of a glass plate (thickness: 1.2 mm) such that the polarizer in the polarizing plate faced the glass plate to prepare a glass-plate bonded polarizing plate.

The degree of polarization C (0) was measured at the diagonal center (ρ0) of the glass-plate bonded polarizing plate. The degree of polarization was evaluated with an automatic polarizing film evaluation system VAP-7070 (available from JASCO Corporation) and dedicated programs.

The degree of polarization C (0), which is regarded as early performance, was evaluated in accordance with the following criteria:
◎: 99.990%≤early performance
○: 99.960%≤early performance<99.990%
Δ: 99.930%≤early performance<99.960%
X: 99.900%≤early performance<99.930%
(Durability Evaluation 1: Measurement of Deterioration in Polarization after Storage Under Hot Humid Condition)

The glass-plate bonded polarizing plate was left under a hot humid environment at 60° C. and a relative humidity of 90% for 300 hours. The degree of polarization C' (0) was then measured at the diagonal center (ρ0) of the polarizing plate.

Durability, which was determined by Δ Degree of polarization=Degree of polarization C (0)–Degree of polarization C' (0), was evaluated in accordance with the following criteria:

◎: Δ Degree of polarization<0.1%
○: 0.1%≤Δ Degree of polarization<0.2%
Δ: 0.2%≤Δ Degree of polarization<0.5%
X: 0.5%≤Δ Degree of polarization
(Durability Evaluation 2: In-Plane Variation in Degree of Polarization after Storage Under Hot Humid Condition)

The glass-plate bonded polarizing plate was left under a hot humid environment at 60° C. and a relative humidity of 90% for 300 hours. The degree of polarization C' was then measured at 13 points, in detail, at one point in the diagonal center (ρ0) of the polarizing plate, four points shifted from the diagonal center by 25% (ρ25), four points shifted from the diagonal center by 50% (ρ50), and four points shifted from the diagonal center by 75% (ρ75). The difference between a maximum degree of polarization and a minimum degree of polarization was determined to calculate the variation in degree of polarization (%) or the rate of the difference to the average degree of polarization (or the average degree of the polarization at the 13 points). The variation in degree of the polarization (%) was then evaluated in accordance with the criteria described below:
◎: variation in degree of polarization<1.0%
○: 1.0%≤variation in degree of polarization<2.0%
Δ: 2.0%≤variation in degree of polarization<5.0%
X: 5.0%≤variation in degree of polarization The results of the evaluation for the pencil hardness, degree of polarization C (0), Δ degree of polarization, and variation in degree of polarization are shown in Table 2.

TABLE 2

| | Polarizer | | Hard coat layer | | | | Evaluation | | | |
| | | | | | | | Early | Durability evaluation 1 | Durability evaluation 2 | |
| | | | Coating | UV rays exposure | Dried | Surface properties | performance Degree of | Δ Degree of | Variation in degree of | |
| Polarizing plate No. | Polarizer No. | Thickness (μm) | solution No. | dose (mJ/cm²) | thickness (μm) | Pencil hardness | polarization C. (0) | polarization | polarization | Remarks |
|---|---|---|---|---|---|---|---|---|---|---|
| 101 | Polarizer 1 | 10 | Coating solution 1 | 900 | 15 | 4 H | X | X | X | Comparative |
| 102 | Polarizer 2 | 10 | Coating solution 2 | 900 | 10 | 3 H | X | Δ | X | Comparative |
| 103 | Polarizer 1 | 10 | Coating solution 3 | 900 | 10 | H | ○ | ○ | ○ | Inventive |
| 104 | Polarizer 3 | 4 | Coating solution 4 | 600 | 10 | HB | ○ | ○ | ○ | Inventive |
| 105 | Polarizer 3 | 4 | Coating solution 5 | 500 | 10 | B | ◎ | ◎ | ○ | Inventive |
| 106 | Polarizer 3 | 4 | Coating solution 4 | 900 | 4 | F | ◎ | ◎ | ◎ | Inventive |
| 107 | Polarizer 3 | 4 | Coating solution 4 | 400 | 4 | B | ◎ | ◎ | ◎ | Inventive |
| 108 | Polarizer 4 | 5 | Coating solution 4 | 400 | 4 | B | ○ | ○ | ○ | Inventive |
| 109 | Polarizer 5 | 0.5 | Coating solution 4 | 400 | 4 | B | ◎ | ◎ | ◎ | Inventive |
| 110 | Polarizer 6 | 4 | Coating solution 4 | 400 | 4 | B | ○ | ○ | Δ | Inventive |
| 111 | Polarizer 7 | 0.2 | Coating solution 4 | 400 | 4 | B | X | X | X | Comparative |
| 112 | Polarizer 4 | 5 | Coating solution 6 | 300 | 4 | 3 B | X | X | Δ | Comparative |
| 113 | Polarizer 8 | 30 | Coating solution 4 | 400 | 4 | F | ○ | X | Δ | Comparative |

Table 2 demonstrates that the polarizing plates (No. 103 to No. 110) each having a configuration described in the present invention exhibit high polarization and high resistance after being stored under a hot humid condition compared to Comparative Examples.

EXAMPLE 2

(Polarizing Plate with Retardation Film)
<<Preparation of Retardation Film R-1>>
<Preparation of Microparticle Dispersion Liquid>

| | |
|---|---|
| Microparticles (AEROSIL R972V, available from Nippon Aerosil Co., Ltd.) | 11 parts by mass |
| Ethanol | 89 parts by mass |

These materials were mixed with stirring with a dissolver for 50 minutes and then dispersed with a Manton-Gaulin disperser to prepare a microparticle dispersion liquid.

<Preparation of Microparticle-Containing Solution>

The microparticle dispersion liquid was gradually added into a dissolving tank charged with methylene chloride with thorough stirring. Methylene chloride and the microparticle dispersion liquid were mixed in the following proportion. The mixture was then dispersed with an attritor such that the secondary particles had a predetermined diameter. The mixture was then filtrated through FINE MET NF available from Nippon Seisen Co., Ltd. to prepare a microparticle-containing solution.

| | |
|---|---|
| Methylene chloride | 99 parts by mass |
| Microparticle dispersion liquid | 5 parts by mass |

<Preparation of Main Dope>

A main dope having the following composition was prepared.

Methylene chloride and ethanol were added as a solvent to a pressure dissolving tank, which was then charged with cellulose acetate and others with stirring. The mixture was heated with stirring to be thoroughly dissolved and filtrated through Azumi filter paper No. 244 available from Azumi Filter Paper Co., Ltd. to prepare a main dope.

| | |
|---|---|
| Methylene chloride | 340 parts by mass |
| Ethanol | 64 parts by mass |
| Cellulose acetate (degree of acetylation: 2.45, Mn: 53,000) | 100 parts by mass |
| Sugar ester compound (1) | 10.0 parts by mass |
| Retardation enhancer (refer to Table 3) | 2.5 parts by mass |
| Microparticle-containing solution | 1.0 parts by mass |

The sugar ester compound (1) is a compound represented by Formula (1) below.

A retardation enhancer used for a retardation film R-1 is a compound represented by Formula (A) below.

[Chemical Formula 1]

Sugar ester compound (1)

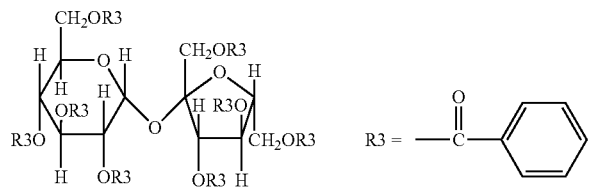

[Chemical Formula 2]

Retardation enhancer

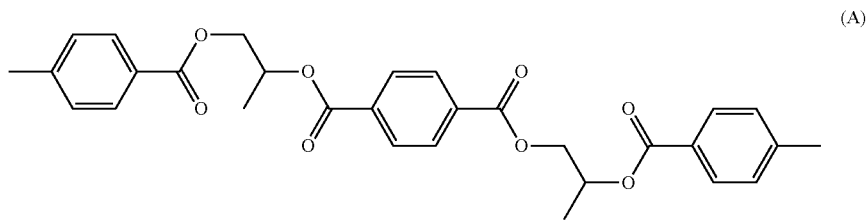

(A)

Mw: 519

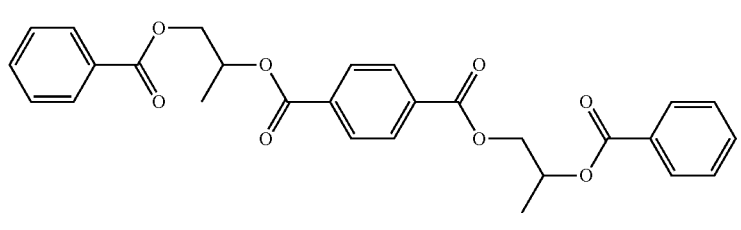

(B)

Mw: 491

-continued

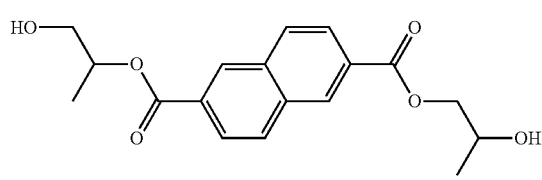

(C)

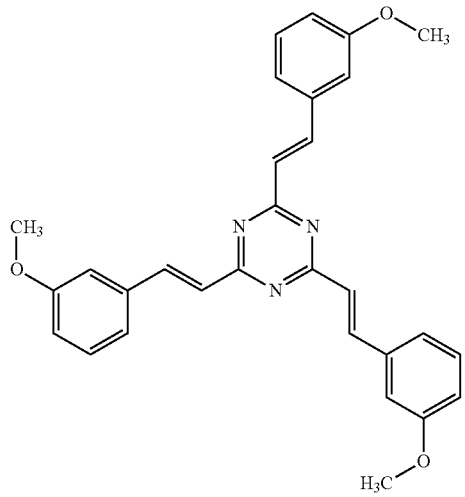

(D)

<Preparation of Film>

The main dope was then uniformly cast on a stainless steel belt support into a width of 2,000 mm with an endless belt casting machine at 33° C. The stainless steel belt was kept at 30° C.

The main dope cast into a film on the stainless steel belt support was dried such that the solvent remaining in the film was reduced to 75% and then removed from the stainless steel belt support under a tension of 130 N/m.

The film was then stretched to 1.35 times its original width in the transverse direction (TD) at a stretching temperature of 170° C. with fixing the transverse ends of a web. The transverse ends were fixed to keep the width for several seconds and then released after the tension in the transverse direction was loosened. The film was further dried through a third drying zone set at 125° C. for 30 minutes. The solvent remaining in the film was 30% at the start of stretching.

The film was then conveyed by a large number of rollers to pass through a drying zone to complete a drying process. The film was dried at 130° C. and conveyed by applying a tension of 100 N/m.

In the manner described above, a retardation film R-1, which had a width of 1,300 mm, a knurling of 1 cm in width and 8 μm in height on its ends, a dried thickness of 65 μm and a retardation represented by nx−ny=6.5×10$^{-4}$, was prepared.

<<Preparation of Retardation Film R-2 to R-6>>

Retardation films R-2 to R-6 were prepared as in the retardation film R-1 except that the stretching temperature, stretching ratio, retardation enhancer, thickness of the dried film were replaced with the ones as shown in Table 3. The retardation enhancer used for the respective retardation films was any of the compounds represented by Formulae (A) to (D) (refer to Table 3).

<<Preparation of Retardation Film R-7>>

A 100 μm-thick isotropic optical film of cyclopolyolefin (available from Zeon Corporation, brand name "ZeonorFilm ZF14") was biaxially stretched with a tenter stretching machine at a stretching temperature of 138° C. in the machine and transverse directions simultaneously at a ratio of 1.41 times. One side of the film was further corona-treated (corona discharge treatment was applied to one side of the film at an output power of 0.8 KW with an RF transmitter (available from KASUGA ELECTRIC WORKS LTD., RF power AGI-024)) to prepare a 50 μm-thick retardation film R-7 having a contact angle of 32° at 23° C.

(Preparation of Polarizing Plate with Retardation Film No. 201)

A polarizing plate with retardation film No. 201 was prepared by bonding a retardation firm R-1 to a polarizing plate No. 107 in accordance with Steps 1 to 5 below.

Step 1: A film was immersed in a 2 mol/L sodium hydroxide solution of a temperature of 60° C. for 90 seconds, then washed with water, dried and saponified to prepare a retardation film R-1.

Step 2: A surface of a polarizer of a polarizing plate No. 107 was coated with a poly(vinyl alcohol) adhesive (solid content: 2 mass %).

Step 3: The retardation film R-1 processed in Step 1 was disposed on the surface, which was coated with a poly(vinyl alcohol) adhesive in Step 2, of the polarizing plate No. 107.

Step 4: The retardation film R-1 and the polarizing plate No. 107 laminated in Step 3 were bonded together under a pressure of 20 to 30 N/cm$^2$ and at a conveying rate of about 2 m/min.

Step 5: The polarizing plate prepared in Step 4 was dried in a drying machine set at 80° C. for 2 minutes to prepare a polarizing plate with a retardation film No. 201 in a rolled form.

(Preparation of Polarizing Plates with Retardation Films No. 202 to No. 206)

Each of the polarizing plates with retardation films No. 202 to No. 206 in a rolled form was prepared as in the polarizing plate No. 201 except that films (R-2 to R-6) shown in Table 3 were used in place of the retardation film.

(Production of Polarizing Plate with Retardation Film No. 207)

An active energy ray curable resin composition (a) was prepared in accordance with the description in Japanese Unexamined Patent Application Publication No. 2012-52000 and was applied on a corona-treated surface of a retardation film R-7. Under the same production conditions as in Example 1 of the patent, a polarizing plate No. 107 and a retardation film R-7 were bonded together to prepare a polarizing plate with a retardation film No. 207 in a rolled form.

As described above, polarizing plates with retardation films No. 201 to No. 207 in a rolled form were prepared. Each polarizer of the polarizing plates has an absorption axis in the machine direction whereas the retardation film has a slow axis in the transverse direction (these axes are orthogonal to each other).

<<Evaluation of Polarizing Plate Having Retardation Film>>

The polarizing plates (No. 201 to 207) having the retardation films were evaluated as follows.

(Durability Evaluation 1: Measurement of Deterioration in Polarization after Storage Under Hot Humid Condition)

The rolled polarizing plate having the retardation film was wound off to be cut, at a portion located 500 m distant from the outer end of the roll (along a longitudinal direction) and the center of the width direction, into a size of a 42-inch liquid crystal panel (930 mm×520 mm). The polarizing plate cut into the panel was subjected to durability evaluation 1 in the same manner as described above.

(Durability Evaluation 3: Unevenness of Polarization of Polarizing Plate after being Stored in Rolled Form Under Hot Humid Condition)

The rolled polarizing plate having the retardation film was left under a hot humid condition at a chamber temperature of 60° C. and a relative humidity of 90% for a week. The degree of polarization of the polarizing plate being the outermost surface of the roll was then measured at points positioned 25%, 50%, and 75% of the overall width. The degree of polarization was also measured in the same manner at 150 points in total (3×50 points), the 50 points being spaced every 10 m within a distance of 500 m from the outer end toward the core of the roll along the longitudinal direction of the polarizing plate. The rate (%) of the difference between a maximum degree of polarization and a minimum degree of polarization among all points to the average degree of polarization among all points was determined to be "unevenness of polarization 1". The degree of polarization was evaluated with an automatic polarizing film evaluation system VAP-7070 (available from JASCO Corporation) and dedicated programs.

The degree of polarization of the rolled polarizing plate immediately after the production without being stored under a hot humid condition was also measured in the same manner at 150 points. The rate (%) of the difference between a maximum degree of polarization and a minimum degree of polarization among all points to the average degree of polarization among all points was determined to be "unevenness of polarization 2".

Unevenness of polarization 1 and unevenness of polarization 2 were plugged into the expression described below to determine the increment of unevenness of polarization.

Increment of unevenness (%)=Unevenness of polarization 1(%)−Unevenness of polarization 2(%)

Unevenness of polarization of the polarizing plate after being stored in a rolled form under a hot humid condition was evaluated in accordance with the following criteria:

◎: Increment of unevenness<1.0%
○: 1.0%≤Increment of unevenness<2.0%
Δ: 2.0%≤Increment of unevenness<5.0%
X: 5.0%≤Increment of unevenness The results of the evaluation are shown in Table 3.

TABLE 3

| | | Retardation film bonded | | | | | | Evaluation | | |
| --- | --- | --- | --- | --- | --- | --- | --- | --- | --- | --- |
| | | | | | | | | Durability evaluation 1 | Durability evaluation 3 | |
| Polarizing plate No. | Polarizing plate No. used | No. | Stretching temperature (° C.) | Stretching ratio | Retardation enhancer | Dried film thickness (μm) | nx − ny | Δ Degree of polarization | Increment of unevenness | Remarks |
| 201 | 107 | R-1 | 170 | 1.35 | A | 65 | 6.5 · E−04 | Δ | ○ | Inventive |
| 202 | 107 | R-2 | 165 | 1.38 | B | 57 | 9.0 · E−04 | ○ | ○ | Inventive |
| 203 | 107 | R-3 | 165 | 1.40 | A | 41 | 1.3 · E−03 | ◎ | ◎ | Inventive |
| 204 | 107 | R-4 | 150 | 1.45 | C | 25 | 2.1 · E−03 | ◎ | ◎ | Inventive |
| 205 | 107 | R-5 | 125 | 1.24 | D | 35 | 3.9 · E−03 | ○ | ○ | Inventive |
| 206 | 107 | R-6 | 140 | 1.30 | C | 28 | 5.0 · E−03 | ○ | Δ | Inventive |
| 207 | 107 | R-7 | 138 | 1.41 | — | 50 | 1.0 · E−03 | ◎ | ◎ | Inventive |

Table 3 demonstrates that the polarizing plates (No. 201 to No. 207) each having a configuration described in the present invention exhibit high resistance to deterioration and unevenness of polarization after being stored in a rolled form under a hot humid condition.

EXAMPLE 3

(Organic EL Display Device; Visibility of Image Display Device)

<Preparation of Circularly Polarizing Plate>

Using each of the polarizing plates No. 101 to No. 110 prepared in Example 1, a circularly polarizing plate was produced by bonding, in sequence, an acrylic adhesive layer having a thickness of 20 μm and an aromatic polycarbonate λ/4 plate (available from Teijin Chemicals Ltd., PURE-ACE WR, R(450)=115 nm, R(550)=138 nm, R(590)=142 nm, R(450)/R(590)=0.81) to a second surface of the polarizing plate. Each polarizing plate (No. 101 to No. 110) was bonded to the λ/4 plate such that the absorption axis of the polarizer and the slow axis of the λ/4 plate intersect at a degree of 45°±2°.

<<Preparation of Organic EL Display Devices No. 301 to No. 310>>

An organic EL display device (image display device) prepared was GALAXY S available from SAMSUNG ELEC- TRONICS CO., LTD. The organic EL display device was disassembled to remove a polarizing plate disposed on a touch panel, and the glass surface of the touch panel was cleaned.

An acrylic adhesive layer having a thickness of 20 μm and the circularly polarizing plate were bonded in sequence such that the λ/4 plate was adjacent to an organic EL element, producing organic EL display devices No. 301 to No. 310 (refer to FIG. 3).

The organic EL display devices No. 301 to No. 310 produced through the above-described process were subjected to evaluation of unevenness of front luminance and reflectance by the procedures described below.

(Evaluation of Unevenness of Front Luminance)

The organic EL display devices (No. 301 to No. 310) were stored under a hot humid environment at 60° C. and a relative humidity of 90% for 1500 hours, and were then humidified in an environment at 25° C. and a relative humidity of 60% for 20 hours.

The front luminance was then measured at 13 points, that is, at one point in the diagonal center of the display screen, four points shifted from the diagonal center by 25%, four points shifted from the diagonal center by 50%, and four points shifted from the diagonal center by 75%. The difference between a maximum luminance and a minimum luminance was determined to calculate the Δ luminance (%) or rate of the difference to the average luminance (or the average of the luminance at the 13 points). The unevenness of the front luminance was then evaluated in accordance with the criteria described below.

The light-emitting luminance from the normal direction (front direction) of the display screen (specifically, from a direction inclined 2° from the normal direction) was measured with a spectral radiance meter CS-1000 (available from Konica Minolta Sensing, Ltd.).

⊚: Δ luminance<1.0%

◯: 1.0%≤Δ luminance<2.0%

Δ: 2.0%≤Δ luminance<5.0%

X: 5.0%≤Δ luminance (Evaluation of Unevenness of Reflectance)

The organic EL display devices (No. 301 to No. 310) were left under a hot humid condition at 60° C. and a relative humidity of 90% for 1500 hours and were then humidified under an environment at 25° C. and a relative humidity of 60% for 20 hours.

The reflectance was then measured at 13 points, that is, at one point in the diagonal center of the display screen, four points shifted from the diagonal center by 25%, four points shifted from the diagonal center by 50%, and four points from the diagonal center by 75%. The difference between a maximum reflectance and a minimum reflectance was determined to calculate the Δ reflectance (%) or rate of the difference to the average reflectance (or the average of the reflectance at the 13 points). The unevenness of the reflectance was then evaluated in accordance with the criteria described below.

The reflectance at a wavelength of 550 nm was measured with a spectrophotometer CM2500d (available from Konica Minolta Sensing, Ltd.).

⊚: Δ reflectance<0.3%

◯: 0.3%≤Δ reflectance<0.5%

Δ: 0.5%≤Δ reflectance<1.0%

X: 1.0%≤Δ reflectance

The results of the evaluation are shown in Table 4.

TABLE 4

| Organic EL display device No. | Polarization plate No. used | Unevenness in front luminance | Unevenness in reflectance | Remarks |
|---|---|---|---|---|
| 301 | 101 | X | X | Comparative |
| 302 | 102 | X | X | Comparative |
| 303 | 103 | ◯ | Δ | Inventive |
| 304 | 104 | ◯ | ◯ | Inventive |
| 305 | 105 | ⊚ | ◯ | Inventive |
| 306 | 106 | ⊚ | ⊚ | Inventive |
| 307 | 107 | ◯ | ⊚ | Inventive |
| 308 | 108 | ◯ | ◯ | Inventive |
| 309 | 109 | ⊚ | ⊚ | Inventive |
| 310 | 110 | ◯ | Δ | Inventive |

Table 4 demonstrates that the image display devices each including the polarizing plate of the present invention exhibit lower unevenness of front luminance and reflectance than image display devices of comparative examples even after being stored under a hot humid environment for a long time, and thus have excellent visibility.

EXAMPLE 4

(Liquid Crystal Display Device; Visibility of Image Display Device)

<<Preparation of Liquid Crystal Display Device No. 401>>

A VA mode liquid crystal display device (image display device) prepared was 40" BRAVIA V1 (available from Sony Corporation). The original polarizing plates bonded to the two surfaces of the liquid crystal display device were removed, and the glass surfaces of the liquid crystal panel were cleaned with ethanol. Polarizing plates 201 were bonded to the two (top and bottom) surfaces, respectively, of the liquid crystal panel, preparing a liquid crystal display device No. 401 (refer to FIG. 5).

Each polarizing plate was disposed such that the retardation film was adjacent to the liquid crystal panel, and the hard coat layer was away from the liquid crystal panel. Each polarizing plate was also disposed such that the absorption axis was directed to the same direction as the absorption axis of the original polarizing plate.

<<Preparation of Liquid Crystal Display Devices No. 402 to No. 407>>

Liquid crystal display devices No. 402 to No. 407 were prepared as in liquid crystal display device No. 401 except that the top and bottom polarizing plates were replaced with the polarizing plates described in Table 5 (refer to FIG. 5).

The liquid crystal display devices No. 401 to No. 407 were subjected to evaluation of a decrease in contrast and unevenness of image display by the procedures described below.

(Evaluation of Decrease in Contrast)

The liquid crystal display devices (No. 401 to No. 407) were humidified under an environment at 25° C. and a relative humidity of 60% for 20 hours, and the backlights of the liquid crystal display devices were continuously turned on for one week, and the contrast was then measured. Using EZ-Contrast 160D (available from ELDIM), the contrast CR1 was measured, which was the ratio of a white background luminance in the normal direction to a black background luminance in the normal direction of the liquid crystal display device.

The liquid crystal display devices (No. 401 to No. 407) were processed under an environment at 60° C. and a relative humidity of 90% for 1500 hours, and were then humidified at 25° C. and a relative humidity of 60% for 20 hours, and the contrast "CR2" was the measured in the same procedure as described above.

The decrease in contrast (ΔCR) was determined by the following expression and was evaluated in accordance with the following criteria:

ΔCR=(CR1−CR2)/(CR1)×100(%)

◉: decrease in contrast<5%
○: 5%≤decrease in contrast<10%
Δ: 10%≤decrease in contrast<20%
X: 20%≤decrease in contrast (Evaluation of Unevenness of Image Display)

The liquid crystal display devices (No. 401 to No. 407) were stored under a hot humid environment at 60° C. and a relative humidity of 90% for 1500 hours, and were then humidified at 25° C. and a relative humidity of 60% for 20 hours.

The contrast was then measured at 13 points, that is, at one point in the diagonal center of the display screen, four points shifted from the diagonal center by 25%, four points shifted from the diagonal center by 50%, and four points shifted from the diagonal center by 75%. The difference between a maximum contrast and a minimum contrast was determined to calculate the unevenness of image display (%) or rate of the difference to the average contrast (or the average of the contrast at the 13 points). The unevenness of image display was then evaluated in accordance with the following criteria:

◉: unevenness of image display<5.0%
○: 5.0%≤unevenness of image display<10%
Δ: 10%≤unevenness of image display<20%
X: 20%≤unevenness of image display The results of the evaluation are shown in Table 5.

TABLE 5

| Liquid crystal display device No. | Polarizing plate No. used | | Decrease in contrast | Image display unevenness | Remarks |
| --- | --- | --- | --- | --- | --- |
| | Top polarizing plate No. | Bottom polarizing plate No. | | | |
| 401 | 201 | 201 | Δ | ○ | Inventive |
| 402 | 202 | 202 | ○ | ○ | Inventive |
| 403 | 203 | 203 | ◉ | ◉ | Inventive |
| 404 | 204 | 204 | ◉ | ◉ | Inventive |
| 405 | 107 | 205 | ○ | ○ | Inventive |
| 406 | 107 | 206 | ○ | Δ | Inventive |
| 407 | 207 | 207 | ◉ | ◉ | Inventive |

Table 5 demonstrates that the liquid crystal display devices each including the polarizing plate of the present invention exhibit high resistance to decrease in contrast and unevenness of image display even after being stored under a hot humid environment and thus have excellent visibility.

It is noted that the application of the present invention should not be limited to the embodiments described above, and may appropriately be changed without departing from the scope of the present invention.

INDUSTRIAL APPLICABILITY

The polarizing plate of the present invention which has a small thickness and excellent polarization suitable for production of a VA liquid crystal display device and IPS liquid crystal display device that are free from decrease in contrast and unevenness of image display can be provided.

REFERENCE SINGS LIST

1 polarizer
2 hard coat layer
3 retardation film
10, 11 polarizing plate
12 organic EL element
13 touch panel
14 adhesive
15 glass cover
20 IPS liquid crystal panel
21 VA liquid crystal panel
101-104 image display device

The invention claimed is:

1. A polarizing plate, comprising:
a polarizer; and
a hard coat layer directly disposed on a first surface of the polarizer,
wherein
the polarizer has a thickness ranging from 0.5 μm to 10 μm, and
the hard coat layer has a pencil hardness ranging from B to H.

2. The polarizing plate according to claim 1, further comprising a retardation film disposed on a second surface of the polarizer, the second surface being an opposite surface of the first surface of the polarizer on which the hard coat layer is disposed.

3. The polarizing plate according to claim 1, wherein the first surface of the polarizer is dyed with dichroic pigment and the hard coat layer is layered on the dyed first surface.

4. The polarizing plate according to claim 1, wherein the thickness of the polarizer ranges from 0.5 μm to less than 5 μm.

5. An image display device comprising the polarizing plate of claim 1.

6. A method of manufacturing a polarizing plate comprising:
forming a polarizer including (i) forming a hydrophilic polymer layer on a resin substrate by a first coating process; (ii) stretching the hydrophilic polymer layer into a thickness ranging from 0.5μm to 10μm and (iii) dyeing the hydrophilic polymer layer with dichroic pigment, the stretching and the dyeing are executed in any order; and
forming a hard coat layer having a pencil hardness ranging from B to H on the polarizer by a second coating process.

7. An image display device comprising the polarizing plate produced by the method according to claim 6.

* * * * *